United States Patent
Zhang et al.

(10) Patent No.: US 11,153,886 B2
(45) Date of Patent: Oct. 19, 2021

(54) SYSTEM AND METHOD ON TRANSMISSION ADAPTATION FOR UPLINK GRANT-FREE TRANSMISSION

(71) Applicant: Huawei Technologies Co., Ltd., Shenzhen (CN)

(72) Inventors: Liqing Zhang, Ottawa (CA); Yu Cao, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 444 days.

(21) Appl. No.: 15/864,927

(22) Filed: Jan. 8, 2018

(65) Prior Publication Data

US 2018/0206246 A1 Jul. 19, 2018

Related U.S. Application Data

(60) Provisional application No. 62/446,188, filed on Jan. 13, 2017.

(51) Int. Cl.
| | |
|---|---|
| *H04W 72/08* | (2009.01) |
| *H04L 1/00* | (2006.01) |
| *H04W 74/00* | (2009.01) |
| *H04L 1/18* | (2006.01) |
| *H04W 74/08* | (2009.01) |

(Continued)

(52) U.S. Cl.
CPC ............ *H04W 72/085* (2013.01); *H04L 1/00* (2013.01); *H04L 1/1896* (2013.01); *H04W 74/006* (2013.01); *H04L 1/1812* (2013.01); *H04L 1/1887* (2013.01); *H04L 12/189* (2013.01); *H04L 69/323* (2013.01);
(Continued)

(58) Field of Classification Search
CPC ............ H04W 72/085; H04W 74/006; H04W 74/0808; H04W 76/27; H04W 72/042; H04W 88/08; H04L 1/00; H04L 1/1896; H04L 1/1812; H04L 1/1887; H04L 12/189; H04L 69/323
See application file for complete search history.

(56) References Cited

U.S. PATENT DOCUMENTS

| | | | |
|---|---|---|---|
| 10,367,621 B2 * | 7/2019 | Jiang | ..................... H04L 1/1671 |
| 10,560,926 B2 * | 2/2020 | Luo | ................... H04W 72/0413 |

(Continued)

FOREIGN PATENT DOCUMENTS

| | | |
|---|---|---|
| CN | 105682232 A | 6/2016 |
| CN | 105722234 A | 6/2016 |
| WO | 2016206083 A1 | 12/2016 |

OTHER PUBLICATIONS

3GPP TSG RAN WG1 AH_NR Meeting R1-1700206,"UL grant-free transmission for URLLC", CATT, Jan. 16-20, 2017, 2 pages.

*Primary Examiner* — Hoang-Chuong Q Vu
(74) *Attorney, Agent, or Firm* — Slater Matsil, LLP

(57) ABSTRACT

An embodiment method for transmission adaptation includes sending, by an access point, to a UE, an indication of a configuration or a reconfiguration of at least one UE uplink transmission parameter for grant-free uplink transmissions, wherein the at least one UE uplink transmission parameter includes at least one of a transmission resource and a transmission scheme; and receiving, by the access point, a UE uplink packet transmission that includes at least one configured or reconfigured transmission parameter.

30 Claims, 11 Drawing Sheets

(51) Int. Cl.
*H04W 76/27* (2018.01)
*H04L 12/18* (2006.01)
*H04L 29/08* (2006.01)
*H04W 72/04* (2009.01)
*H04W 88/08* (2009.01)

(52) U.S. Cl.
CPC ...... *H04W 72/042* (2013.01); *H04W 74/0808* (2013.01); *H04W 76/27* (2018.02); *H04W 88/08* (2013.01)

(56) References Cited

U.S. PATENT DOCUMENTS

| | | | |
|---|---|---|---|
| 10,868,653 B2* | 12/2020 | Iyer | H04B 7/0617 |
| 2004/0219955 A1* | 11/2004 | daCosta | H04W 52/0229 |
| | | | 455/574 |
| 2009/0147688 A1* | 6/2009 | Matsumoto | H04J 11/0056 |
| | | | 370/242 |
| 2009/0207796 A1* | 8/2009 | Chakraborty | H04L 1/0017 |
| | | | 370/329 |
| 2013/0163534 A1* | 6/2013 | Anderson | H04L 1/0026 |
| | | | 370/329 |
| 2013/0163535 A1* | 6/2013 | Anderson | H04L 1/0041 |
| | | | 370/329 |
| 2013/0163537 A1* | 6/2013 | Anderson | H04W 72/1284 |
| | | | 370/329 |
| 2014/0036808 A1* | 2/2014 | Pelletier | H04W 72/14 |
| | | | 370/329 |
| 2014/0269605 A1* | 9/2014 | Pecen | H04W 56/00 |
| | | | 370/330 |
| 2015/0103766 A1* | 4/2015 | Miklos | H04W 76/20 |
| | | | 370/329 |
| 2015/0105025 A1* | 4/2015 | Zhang | H01Q 3/26 |
| | | | 455/63.4 |
| 2016/0337988 A1* | 11/2016 | Nan | H04W 74/08 |
| 2016/0352454 A1* | 12/2016 | Zhang | H04L 1/0003 |
| 2017/0034845 A1* | 2/2017 | Liu | H04L 1/0003 |
| 2017/0063503 A1* | 3/2017 | Liu | H04L 25/03 |
| 2017/0290052 A1* | 10/2017 | Zhang | H04W 74/004 |
| 2017/0318598 A1* | 11/2017 | Islam | H04W 74/08 |
| 2017/0332412 A1* | 11/2017 | Wang | H04W 74/0833 |
| 2017/0374686 A1* | 12/2017 | Agarwal | H04W 72/085 |
| 2018/0035421 A1* | 2/2018 | Lin | H04W 74/0833 |
| 2018/0041858 A1* | 2/2018 | Sheng | H04L 1/0064 |
| 2018/0092104 A1* | 3/2018 | Sheng | H04L 5/0064 |
| 2018/0092122 A1* | 3/2018 | Babaei | H04L 1/1812 |
| 2018/0098360 A1* | 4/2018 | Vos | H04W 72/14 |
| 2018/0132282 A1* | 5/2018 | Ly | H04W 28/0215 |
| 2018/0199334 A1* | 7/2018 | Ying | H04W 72/0413 |
| 2019/0208482 A1* | 7/2019 | Tooher | H04L 27/2607 |
| 2019/0260623 A1* | 8/2019 | Li | H04L 27/2627 |
| 2019/0320467 A1* | 10/2019 | Freda | H04W 74/0833 |
| 2020/0252157 A1* | 8/2020 | Davydov | H04L 1/1812 |

* cited by examiner

Assumptions at network side (eNB)

UE location is known to multiple Transmission Points (TPs), e.g., by measuring UE sounding channel and long-term path loss Internet of Things (IoT) signals are measured in serving TP(s);
then measurement results are exchanged between TPs UE max power and power headroom are known, e.g., from initial access

Uplink Power Control criteria

Use achievable max MCS while minimizing potential interference pollution

E.g., Edge users UE 1 and UE 2 may have different transmission power when applying Power Control (PC), though same MCS due to interference to TP2 is different Different mobility users may have different power margin for link adaptation An additional margin may be provided for link adaptation due to fast fading channel characteristics

Power Control example

For given block error rate, # of resource blocks is assigned, and power offset $\Delta i$ and $CQl_i$ for user i, we choose the highest $MCS_j$ such that $$\text{Interf}(P(MCS_i) + \Delta i) \leq \text{Interf}_{max}$$

$$P(MCS_i) + \Delta i \leq P_{max}$$

where $P(MCS_i)$ is UE Tx power, $P_{max}$ is UE maximum Tx power, $\text{Interf}_{max}$ is allowable max interference to the closest neighbor

FIG. 9

SYSTEM AND METHOD ON TRANSMISSION ADAPTATION FOR UPLINK GRANT-FREE TRANSMISSION

CROSS-REFERENCE TO RELATED APPLICATIONS

This application claims benefit to Provisional Application No. 62/446,188, filed on Jan. 13, 2017, the disclosure of which is hereby incorporated by reference herein in its entirety.

TECHNICAL FIELD

The present disclosure relates generally to a system and method for wireless communications and, in particular embodiments, to a system and method for transmission adaptation for uplink, grant-free transmissions.

BACKGROUND

A user equipment (UE), a mobile station, or a similar component will be referred to herein as a UE. A base station (BS), an evolved node B (eNB), a next generation node B (gNB), or a similar component will be referred to herein as an access point or a BS. In some wireless networks, before a UE can transmit to an access point on an uplink, the UE needs to send a scheduling request to the access point requesting resources for the uplink transmission. Responsive to receiving the scheduling request, the access point might provide the UE with an uplink scheduling grant allocating the resources for the UE to use to transmit data on the uplink.

In some evolving wireless networks, uplink transmissions might occur in a grant-free manner. In the grant-free approach, uplink resources might be preconfigured for and allocated to one or multiple UEs without a UE sending a scheduling request. When a UE is ready to transmit on the uplink, the UE can immediately begin transmitting on the preconfigured resources without the need to ask for and receive an uplink scheduling grant. The grant-free approach might reduce signaling overhead and latency compared to the scheduling request and uplink scheduling grant approach.

SUMMARY

In accordance with an embodiment of the present disclosure, a method for transmission adaptation comprises sending, by an access point, to a UE, an indication of a configuration or a reconfiguration of at least one UE uplink transmission parameter for grant-free uplink transmissions, wherein the at least one UE uplink transmission parameter includes at least one of a transmission resource and a transmission scheme; and receiving, by the access point, a UE uplink packet transmission that includes at least one configured or reconfigured transmission parameter.

In the previous embodiment, the transmission resource or the transmission scheme might comprise at least one of: a modulation and coding scheme used by the UE for uplink transmissions; a packet size used by the UE for uplink transmissions; a packet segmentation for uplink transmissions by the UE; a time-frequency resource group for uplink transmissions by the UE; a numerology for uplink transmissions by the UE, the numerology specifying at least one of a cyclic prefix length, a subcarrier spacing, or a number of symbols per slot; a power control scheme to limit maximum transmission power by the UE for intra- and inter-access point interference reduction; a repetition number that specifies a configured, UE-specific number of times for repetition of transmission of a TB by the UE; or a transmission rule based on traffic arrival and actual transmission opportunities. In any of the previous embodiments, the transmission rule might be a predefined or preconfigured scheme for UE transmission reliability that specifies the configured, UE-specific number of times for repetition of transmission of the TB by the UE. In any of the previous embodiments, the predefined or preconfigured scheme for UE transmission reliability might specify that the UE is to transmit a TB packet at least the configured, UE-specific number of times regardless of TB packet arrival time. In any of the previous embodiments, the access point might perform the configuration or reconfiguration semi-statically or dynamically by at least one of RRC signaling, broadcast/multicast signaling, or L1 signaling. In any of the previous embodiments, the configuration or reconfiguration might specify how the UE is to send an adaptation request or indication message for a UE-originated adaptation operation. In any of the previous embodiments, the reconfiguration might comprise an update of at least one UE transmission parameter, and wherein the update is made in accordance with at least one of: channel quality between the access point and the UE; a speed at which the UE is moving; a location of the UE within a cell; a latency requirement of the UE; a reliability requirement of the UE; an uplink measurement of UE uplink transmission signals; or a request for a change from grant-free transmissions to grant-based transmissions.

In accordance with another embodiment of the present disclosure, a method for transmission adaptation comprises receiving, by a UE, from an access point, an indication of a configuration or a reconfiguration of at least one UE uplink transmission parameter for grant-free uplink transmissions, wherein the at least one UE uplink transmission parameter includes at least one of a transmission resource and a transmission scheme; and sending, by the UE, an uplink packet transmission that includes at least one configured or reconfigured transmission parameter.

In the previous embodiment, the transmission resource or the transmission scheme might comprise at least one of: a modulation and coding scheme used by the UE for uplink transmissions; a packet size used by the UE for uplink transmissions; a packet segmentation for uplink transmissions by the UE; a time-frequency resource group for uplink transmissions by the UE; a numerology for uplink transmissions by the UE, the numerology specifying at least one of a cyclic prefix length, a subcarrier spacing, or a number of symbols per slot; a power control scheme to limit maximum transmission power by the UE for intra- and inter-AP interference reduction; a repetition number that specifies a configured, UE-specific number of times for repetition of transmission of a TB by the UE; or a transmission rule based on traffic arrival and actual transmission opportunities. In any of the previous embodiments, the transmission rule might comprise a predefined or preconfigured scheme for UE transmission reliability that specifies the configured, UE-specific number of times for repetition of transmission of the TB by the UE. In any of the previous embodiments, the predefined or preconfigured scheme for UE transmission reliability might specify that the UE is to transmit a TB packet at least the configured, UE-specific number of times regardless of TB packet arrival time. In any of the previous embodiments, the configuration or reconfiguration might specify how the UE is to send an adaptation request or indication message for a UE-originated adaptation operation. In any of the previous embodiments, the reconfiguration might comprise an update of at least one UE transmission parameter, and wherein the update is made in accordance with at least one of: channel quality between the access point and the UE; a speed at which the UE is moving; a location of the UE within a cell; a latency requirement of the UE; a reliability requirement of the UE; an uplink measurement of UE uplink transmission signals; or a request for a change from grant-free transmissions to grant-based transmissions.

In accordance with another embodiment of the present disclosure, a method for transmission adaptation comprises transmitting, by a UE, a second indication signal that is different from a previously configured first indication signal and that indicates a second transmission scheme selected by the UE and different from a first transmission scheme currently assigned to the UE for grant-free first-packet uplink transmissions.

In the previous embodiment, the first transmission scheme and the second transmission scheme might be semi-statically or dynamically configured or predefined by an access point by RRC signaling or DCI signaling. In any of the previous embodiments, the first transmission scheme and the second transmission scheme each might be at least one of: an MCS; a numerology specifying at least one of a cyclic prefix length, a subcarrier spacing, or a number of symbols per slot; a packet size variation with resource block adaptation for data transmission; a resource group; or an actual number of times for repetition of transmission of a TB by the UE, wherein the actual number of times for repetition of transmission of the TB in at least one scenario is equal to or larger than a configured, UE-specific number of times for repetition of transmission of one TB by the UE. In any of the previous embodiments, a newly arrived data packet might be switched to a different resource block in a single transmission without packet segmentation. In any of the previous embodiments, the UE might select the resource group responsive to determining that switching to a different resource group enhances resource utilization. In any of the previous embodiments, the UE might select the MCS by referring to a lookup table containing a plurality of sets of communication channel parameters, each set correlated with a different MCS, and selecting an MCS correlated with communication channel parameters in the lookup table that match downlink channel conditions measured by the UE. In any of the previous embodiments, the UE might select the MCS to accommodate a data packet size different from a preconfigured data packet size assigned in a preconfiguration of the UE. In any of the previous embodiments, the second indication signal might comprise at least one of: a pilot signal; a demodulation reference signal; a pilot signal associated with a grant-free preconfigured resource group; a preamble; or uplink control information for an adaptation indication. In any of the previous embodiments, the pilot signal might be a member of one of a plurality of subsets of a pool of pilot signals, wherein each of the subsets is associated with a different MCS, and wherein transmission by the UE of one of the pilot signals in a selected subset indicates that an MCS associated with the selected subset is to be used by the UE in a subsequent data transmission. In any of the previous embodiments, when a collision occurs between a first data packet transmitted by the UE and a second data packet transmitted by a second UE, retransmission of the first data packet and the second data packet might occur by at least one of: the UE retransmitting the first data packet at a first time and the second UE retransmitting the second data packet at a second time, wherein the first time and the second time are different; or the UE retransmitting the first data packet at a first frequency resource and the second UE retransmitting the second data packet at a second frequency resource, wherein the first frequency resource and the second frequency resource are different. In any of the previous embodiments, when a collision occurs between a first data packet transmitted by the UE and a second data packet transmitted by a second UE because a same pilot signal is associated with both the first data packet and the second data packet, retransmission of the first data packet and the second data packet might occur by at least one of: the UE retransmitting the first data packet at a first time and the second UE retransmitting the second data packet at a second time, wherein the first time and the second time are different, and wherein the UE and the second UE use the same pilot signal; the UE retransmitting the first data packet at a first frequency resource and the second UE retransmitting the second data packet at a second frequency resource, wherein the first frequency resource and the second frequency resource are different, and wherein the UE and the second UE use the same pilot signal; or the UE and the second UE retransmitting the first data packet and the second data packet with different pilot signals. In any of the previous embodiments, the second indication signal might comprise an initial portion of a data transmission from the UE that includes an indicator indicating at least one of: a transmission adaptation made by the UE; a transmission adaptation requested by the UE; information about transmission characteristics related to the UE; or a request by the UE to use one of a plurality of resource group types, wherein the resource group types include at least a normal type with approximately equal amounts of resources allocated in a time domain and a frequency domain, a low latency type with more resources allocated in the frequency domain than in the time domain, and a low coverage type with more resources allocated in the time domain than in the frequency domain.

In accordance with another embodiment of the present disclosure, a method for transmission adaptation comprises receiving, by an access point, from a UE, a second indication signal that is different from a previously configured first indication signal and that indicates a second transmission scheme selected by the UE and different from a first transmission scheme currently assigned to the UE for grant-free first-packet uplink transmissions.

In the previous embodiment, the access point might semi-statically or dynamically configure or predefine the first transmission scheme and the second transmission scheme by RRC signaling or DCI signaling. In any of the previous embodiments, the first transmission scheme and the second transmission scheme each might be at least one of: an MCS; a numerology specifying at least one of a cyclic prefix length, a subcarrier spacing, or a number of symbols per slot; a packet size variation with resource block adaptation for data transmission; a resource group; or an actual number of times for repetition of transmission of a TB by the UE, wherein the actual number of times for repetition of transmission of the TB in at least one scenario is equal to or larger than a configured, UE-specific number of times for repetition of transmission of one TB by the UE. In any of the previous embodiments, the second indication signal might comprise at least one of: a pilot signal; a demodulation reference signal; a pilot signal associated with a grant-free preconfigured resource group; a preamble; or uplink control information for an adaptation indication. In any of the previous embodiments, the second indication signal might comprise an initial portion of a data transmission from the UE that includes an indicator indicating at least one of: a transmission adaptation made by the UE; a transmission adaptation requested by the UE; information about transmission characteristics related to the UE; or a request by the UE to use one of a plurality of resource group types, wherein the resource group types include at least a normal type with approximately equal amounts of resources allocated in a time domain and a frequency domain, a low latency type with more resources allocated in the frequency domain than in the time domain, and a low coverage type with more resources allocated in the time domain than in the frequency domain.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates an embodiment of power control for grant-free transmissions;

DETAILED DESCRIPTION OF ILLUSTRATIVE EMBODIMENTS

Figure 1A:
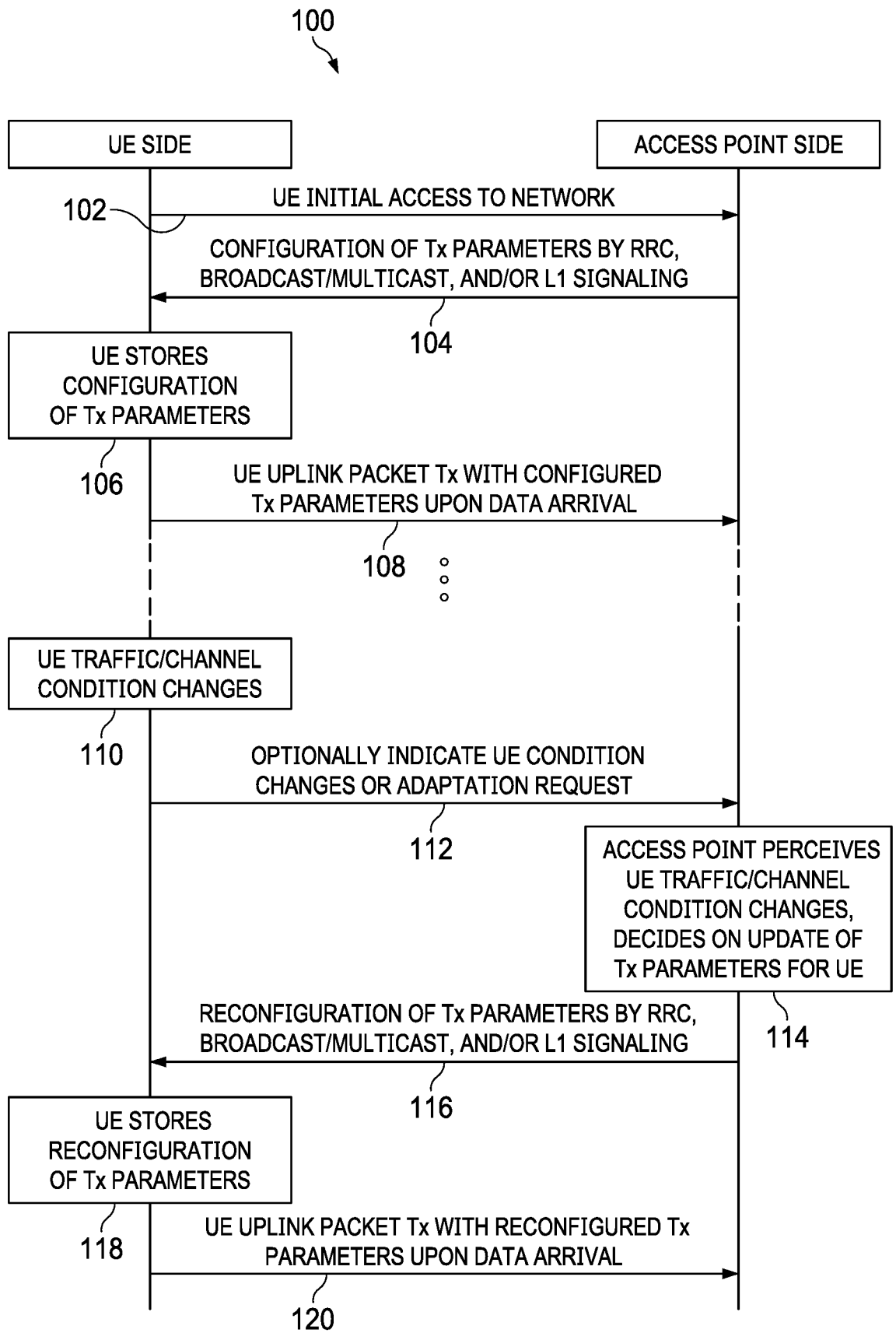
FIG. 1A is a flowchart of an embodiment method for configuration and reconfiguration procedures for UE transmission and transmission adaptation initiated by an access point.

The structure, manufacture and use of the presently preferred embodiments are discussed in detail below. It should be appreciated, however, that the present disclosure provides many applicable novel concepts that can be embodied in a wide variety of specific contexts. The specific embodiments discussed are merely illustrative of specific ways to make and use the embodiments, and do not limit the scope of the disclosure.

Throughout the specification, the term "grant-free transmission" means transmission without a dynamic grant by a base station or an access point. For example, a "grant-free" uplink transmission means an uplink transmission by a UE, which occurs without a base station dynamically allocating resources for the uplink transmission, and without signaling the uplink grant to the UE. Specific transmission resource areas may be allocated by the base station and signaled (e.g., via RRC signaling) to one or more UEs for such grant-free uplink transmissions. Such an allocation of resources for grant-free transmission is also termed "configured uplink grant." The grant-free approach for resource allocation has an advantage of reduced signaling overhead and latency over the scheduling request/uplink scheduling grant approach, but some issues might arise in the grant-free approach. For example, as the same uplink resources can be shared by multiple UEs in a grant-free system, collisions might occur when two or more UEs attempt to use the same resources.

Other issues that might arise in the grant-free approach involve transmission adaptation. That is, it might not be clear how a UE and an access point should adapt to changing transmission conditions or how the UE and the access point should inform one another of any adaptations either of them has made to the changing conditions. For example, when grant-free resources are allocated to multiple UEs, the same modulation and coding scheme (MCS), such as quadrature phase shift keying (QPSK), is typically assigned to all of the UEs initially by the BS. If one of the UEs is in a location with good signal quality, a more aggressive MCS, such as 16 quadrature amplitude modulation (16-QAM), might be more appropriate than the assigned MCS. In a scheduling request/ uplink scheduling grant environment, when a change of MCS is appropriate, an access point might assign a different MCS to a UE in an uplink grant. In a grant-free environment, on the other hand, it might not be clear how a change from one MCS to another should be implemented or how notification of the change should be communicated between the UE and the access point.

As another example, if a UE is in a location with good signal quality and moves to a location with poor signal quality, the UE might need to adapt to the new signal conditions. To do so, the UE might employ a different MCS, transmit with different packet sizes, transmit with repetitions, or make other adaptations. Again, in a grant-free environment, it might not be clear how such adaptations should be implemented or how the UE should notify the access point of a completed transmission adaptation or request a transmission adaptation from the access point.

In an embodiment, techniques are provided for transmission adaptation in wireless networks employing grant-free uplink transmissions. A UE might make measurements of downlink channel conditions and might make assumptions about uplink channel conditions based on the measured downlink channel conditions. The UE might adapt various parameters of its uplink transmissions based on the assumed uplink channel conditions. The UE might then, in one or more manners described in more detail below, inform an access point of the adapted transmission parameters. Alternatively, based on the assumed uplink channel conditions, the UE might send the access point an indication requesting a transmission adaptation. In this case, the initial packet transmission from the UE might still use the previously assigned transmission scheme, but the transmission might include the request indication in the data. That is, an initial portion of a data transmission from the UE might include an indicator indicating a request for an assignment of a new transmission scheme from the access point. A different transmission scheme might be assigned to the UE by the access point depending on one or more factors, including the UE transmission scheme change request, uplink measurements by the access point, and the traffic situation at the access point. Alternatively, the access point can perform uplink signal measurements from a UE such that the UE adaptation can be accomplished by the access point's time-frequency resource and parameter reconfiguration on the UE, either semi-statically or dynamically, for example, by Radio Resource Control (RRC) or L1 (e.g., Downlink Control Information (DCI)) signaling. Moreover, the configuration (or reconfiguration) from the access point can include a parameter to indicate how the UE can send an adaptation request (e.g., which channel) or an indication message (e.g., if a pilot is to be used) for UE-originated adaptation operations. For a UE request for a transmission adaptation, it is possible that the access point might reject the UE's request for changing a transmission scheme based on the uplink measured signal quality from the UE at the access point.

The access point might respond to the UE's transmission adaptation conditions by updating a configuration message for the UE's current transmission scheme based on the UE's conditions, the UE's request for a change, system traffic loading, resource availability, or other factors. Alternatively, the access point might reject a configuration message or simply do nothing. If the UE is not able to receive a transmission scheme reconfiguration or an updating message from the access point, the UE might continue using the current transmission scheme until an update message for the reconfiguration is received from the access point. The UE can continue using the transmission adaptation indication signals as needed for its transmissions. The access point can reconfigure the UE transmission scheme using an update control message, either semi-statically or dynamically, for example, by RRC, broadcast/multicast, or L1 (e.g., DCI) signaling. Optionally, the transmission scheme change might be made temporary for a period of the time through the use of a timer or a counter. After the period of the time, the network might return the UE's transmission scheme configuration to the previous configuration or to a default configuration.

For a transmission adaptation originated from a UE, the transmission scheme change might be due to, for example, UE channel condition variations such as downlink pilot measurements, environment changes such as the UE moving to a different network area or moving from a slow moving state to a fast moving state, arrival packet size variations, traffic loading and contention changes, and UE RRC state changes (e.g., from RRC connected state to RRC inactive state or vice versa). Among the uplink transmission parameters that might be adapted are the MCS, packet size, and numerology for uplink transmissions; the segmentation of packets; the repetition of packets; and a designation of the resources to be used for data transmission.

Regarding adaptation to the traffic arrival and the repetitions of UE packets based on transmission opportunities, a configured UE-specific repetition K by the access point/BS (e.g., by RRC signaling in the UE connected state or by broadcast signaling in the UE inactive and/or idle states) indicates that the UE needs to transmit a transport block (TB) K times to guarantee transmission reliability or coverage. To achieve this, the access point/BS needs to configure (or preconfigure/predefine) K transmission resources for the UE in each periodicity period. Moreover, the preconfigured or predefined K transmission resources are associated with and fixed in the time domain and preconfigured with the same Hybrid Automatic Repeat Request (HARQ) identifier (ID) in one periodicity period for HARQ operations, and K transmission resources are repeated (e.g., in terms of the time domain) based on resource periodicity. For multiple (N>1) HARQ processes, one HARQ ID is associated with K transmission resources in each periodicity period and can be different from one periodicity period to another. For example, given a HARQ ID value in the current period, HIDi, the HARQ ID value for the next periodicity period, HIDj, can be calculated by HIDj=(HIDi+1) modular N (where HIDi can be any value from 0 to N−1). On one hand, it is possible that a TB of the UE can arrive in a timely manner such that the TB can be transmitted starting from the first of the K transmission resources for K repetitions (that include the initial transmission) within one periodicity period. On the other hand, as a TB of the UE can arrive at any time due to the grant-free burst traffic nature, for K transmission resources within one resource periodicity, the initial transmission may not be able to start from the first of the K transmission resources (rather than any of the other resources). In general, an initial packet transmission can start from any available resource of K transmission resources (depending on the packet arrival timing) in the current (periodicity) period. In some embodiments, redundant (encoded) versions of a redundancy version (RV) pattern can be configured and associated with the K transmission resources in each (periodicity) period, where an initial transmission may have limited transmission opportunities among the K resources depending on a resource and its associated RV. For example, a transmission resource with a self-decodable RV can be used for the initial transmission. Therefore, it may be the case that the actual number of transmission opportunities among the K configured transmission resources is less than K, or even much less than K. For example, K might be configured to 8 and the actual number of transmissions might be only 3. That is, the TB might arrive in a certain time interval and can be transmitted in the last three resources for its initial transmissions and repetitions in the current periodicity period. As a result, the UE and/or the access point/BS should determine how to achieve reliable transmission for the UE's TB in such scenarios where K repetitions are configured for the UE but the actual transmission number is less than K.

To address the above problems, at least two schemes (or transmission rules) can be applied. In one scheme, the UE can continue to transmit the same TB among the K transmission resources in the next periodicity period (e.g., immediately) after transmitting in some (but not all) of the K resources in the current periodicity period. In such a case, the TB can be transmitted K times in total (including the transmission times in the current periodicity period) or transmitted in all the K resources in the next periodicity period (with a total number of transmissions for the TB>K). Such a scheme is applicable when there is no new TB in the UE data buffer and can also be applicable if there are new TBs in the UE data buffer. If there are new TBs in the UE data buffer when the current TB transmission is ongoing, another scheme can be employed by applying an indicator from the UE. The indicator can be separately sent by an uplink control channel (dedicated or shared used for transmission of uplink control information such as a scheduling request) or transmitted with the TB packets (e.g., by piggybacking) in order to notify the access point to either schedule dedicated resources for transmission of the new TBs or switch the ongoing TB from grant-free transmission to grant-based retransmission (if the data detection for the TB still fails). In the latter option, the indicator can be designed similarly to, e.g., an extended or modified buffer state report (BSR) message to indicate either a switch from grant-free to grant-based transmission for the ongoing TB or grant-based scheduling for new TBs. An indication rule or protocol can be preconfigured or predefined for the indicator by the access point/BS, either semi-statically or dynamically, for example, by RRC or L1 (e.g., DCI) signaling. In some embodiments, an initial transmission of a UE TB can always start from the first of the K resources in a periodicity period to guarantee the configured K transmission repetitions to achieve reliability, which means that, e.g., a UE TB (initial) transmission might need to wait until the next period if the TB arrival misses the first transmission resource opportunity among the K transmission resources in the current period. In other embodiments, redundant (encoded) versions of an RV pattern can be configured and associated with the K transmission resources, but a HARQ ID is not associated with K resources and instead is associated with an initial transmission and the following K−1 repetitions. Once the initial transmission of a UE TB starts, the UE can transmit the TB K times in K transmission resources possibly allocated in two periodicity periods. In the case of K transmission resources across two periodicity periods, the HARQ ID can be the one calculated for the first periodicity period, where a HARQ ID is calculated in the manner provided above.

In an embodiment, the transmission adaption might be indicated by an indication signal such as a pilot signal or a demodulation reference signal (DMRS) that has been predefined to be associated with a particular transmission scheme. Alternatively or additionally, the indication signal might be a preamble, such as those used in Long Term Evolution (LTE) systems, which can function as, for example, an uplink channel estimation, a timing estimation, a scheduling request, or a UE identification. Alternatively or additionally, the indication signal might be transmitted using a separate uplink control channel for the adaptation indication before or simultaneously with transmission of a first data packet. Such a data transmission might be based on either frequency division multiplexing or time division multiplexing. The uplink control channel for this type of signaling might be defined exclusively for a single user or might be shared by more than one user with, for example, coding, time, frequency, and/or spatial division. Different transmission schemes might also be associated with grant-free preconfigured resource groups.

In an embodiment, the transmission adaptation scheme might apply to the first data packet transmission in a data burst arrival from a UE. Subsequent transmissions or retransmissions from the UE might make use of feedback from an access point related to the first packet transmission, such as acknowledgements (ACKs), negative acknowledgements (NACKs), or access point signaling messages. As described in more detail below, such adaptations might take into account the downlink and uplink channel quality measurements, the UE's activity state, the UE's mobility, optional uplink synchronization schemes, the cell size, traffic congestion, pilot signal collisions, the reliability of the UE, and the latency of the UE. Details regarding these topics are provided below. In addition, details will be provided regarding signaling support with respect to these topics, on both the network side and the UE side.

An adaptation in an uplink transmission parameter might apply to a UE's preconfigured configuration or to the UE's current configuration in a case where the preconfigured configuration has previously been changed. When reference is made herein to a change in a preconfigured parameter, it should be understood that the change might be made to the current value of a parameter that has been changed at least once from a preconfigured value.

FIG. 1A depicts an embodiment method 100 for configuration and reconfiguration procedures for UE transmission and transmission adaptation initiated by an access point. At event 102, a UE communicates with an access point to make initial access to a network. At event 104, the access point performs a configuration of one or more UE transmission parameters through RRC signaling, broadcast/multicast signaling, and/or L1 signaling. At event 106, the UE stores the configuration of the transmission parameters. At event 108, the UE performs an uplink packet transmission with the configured transmission parameters upon data arrival. At event no, at a later time, the UE's traffic and/or channel conditions change. At event 112, the UE optionally indicates that the traffic and/or channel conditions have changed or transmits an adaptation request to the access point. At event 114, the access point perceives that the traffic and/or channel conditions have changed and decides on an update of transmission parameters for the UE. At event 116, the access point performs a reconfiguration of one or more UE transmission parameters through RRC signaling, broadcast/multicast signaling, and/or L1 signaling. At event 118, the UE stores the reconfiguration of the transmission parameters. At event 120, the UE performs an uplink packet transmission with the reconfigured transmission parameters upon data arrival.

Adaptation to channel conditions will now be considered. As mentioned above, if the preconfigured resources for a UE are inappropriate or if the channel quality between the UE and an access point changes, changes might be needed to the parameters that were preconfigured on the UE for grant-free transmissions or that are currently assigned to the UE for grant-free transmissions due to a previous change in the preconfigured parameters. Such parameters might include the MCS, the pilot signals used by the UE, and the numerology used by the UE, where the numerology might include the spacing of subcarriers in uplink transmissions, the length of the cyclic prefix used in uplink transmissions, or the number of symbols per time slot.

Figure 1B:
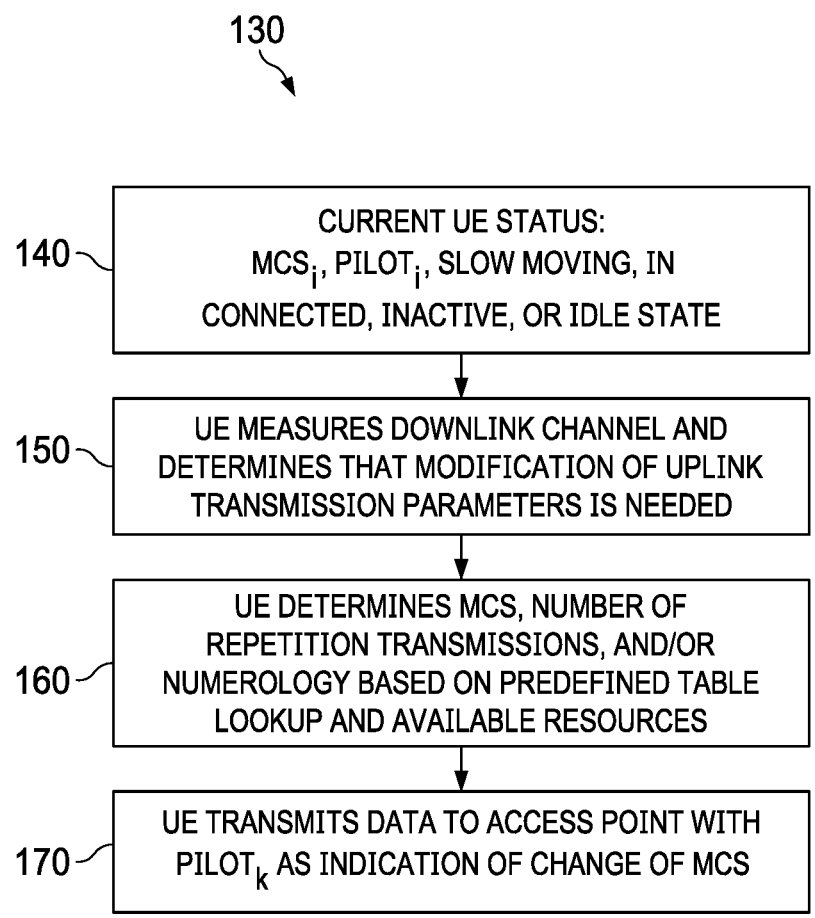
FIG. 1B is a flowchart of an embodiment method for adaptation to channel conditions.

FIG. 1B is a flowchart of an embodiment method 130 for a UE's transmission adaptation to channel conditions in a grant-free environment. At block 140, a UE currently has a preconfigured MCS ($MCS_j$) and a preconfigured pilot (pilot$_j$), is moving slowly, and has an RRC state of either connected, inactive, or idle. At block 150, the UE measures its downlink channel. That is, the UE might determine the channel quality between the UE and an access point with which the UE is communicating by performing measurements on reference signals received by the UE from the access point. In this example, the UE determines that the downlink channel conditions have changed. The UE infers that the uplink channel conditions have similarly changed and that the UE's uplink transmission parameters should therefore be modified from their preconfigured or current values. At block 160, the UE determines an MCS, a number of times for packet transmission repetition, and/or a numerology that are appropriate for the uplink conditions assumed to exist based on the changed downlink conditions. As shown at block 160, and as described in more detail below, the determination might be made based on a predefined lookup table containing different transmission schemes (including MCS schemes) for uplink transmissions. At block 170, the UE transmits data with the newly determined MCS, the new number of times for packet transmission repetition, and/or the new numerology. An access point might then use the MCS to decode a data transmission from the UE. In an embodiment, as described in more detail below, the UE transmits the data with a different pilot (pilot$_k$) from the preconfigured pilot (pilot$_j$) to indicate to the access point the new values of the uplink transmission parameters. Alternatively, the UE might use some other type of indicator to indicate to the access point the new or desired values of the uplink transmission parameters.

Figure 2:
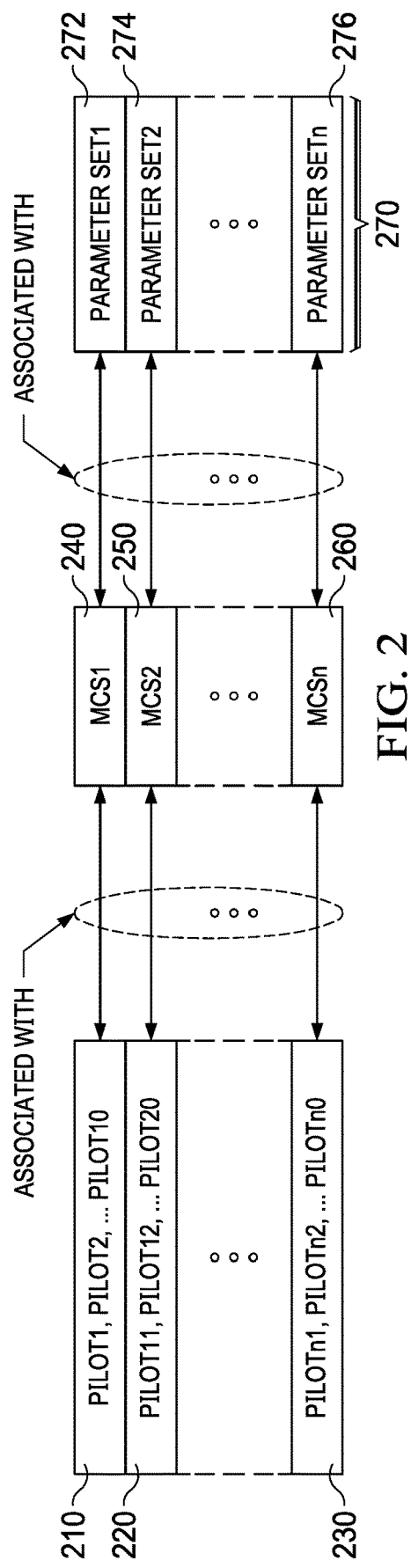
FIG. 2 illustrates a UE's indication of channel adaptations by pilot signals.

FIG. 2 provides embodiment details on how a UE might use a selected pilot signal to inform an access point of an MCS the UE has chosen for its future uplink transmissions based on recent downlink channel measurements. In an embodiment, a pool of pilots that the UE might transmit is predefined to be split into a plurality of subsets. Each subset might be associated with a different MCS, and the UE might choose to transmit one of the pilots from a particular subset to indicate that future transmissions from the UE will use the MCS associated with that subset. For example, pilot1 through pilot10 might be placed in a first subset 210, pilot11 through pilot20 might be placed in a second subset 220, and so on up to an nth subset 230. The first subset 210 might be associated with a first MCS 240, the second subset 220 might be associated with a second MCS 250, and so on up to the nth subset 230 and an nth MCS 260. If the UE has determined that the first MCS 240, for instance, is appropriate for its future transmissions, the UE might begin transmitting with the first MCS 240. The UE informs the access point that the UE is transmitting with the first MCS 240 by transmitting one of the pilots from the first subset 210. The UE might select a predefined one of the pilots from the appropriate subset or might select a random one of the pilots from the appropriate subset. It should be understood that the number of pilots in a subset, the number of subsets, and the number of MCSs given above are only examples and that other values could be used.

In an embodiment, a UE might determine the MCS that is appropriate for the UE's future transmissions based on values in a lookup table 270. The lookup table 270 might be created by associating measured downlink parameters with uplink measurement parameters (e.g., signal-and-interference-to-noise ratio (SiNR) and deployment environments) or by using a calibrated uplink and downlink reciprocity relationship to make the table. The UE might make measurements of parameters such as the downlink SiNR and a downlink pilot signal. The UE might also be aware of such parameters as its mobility and its coverage. Different combinations of the values of such parameters in the lookup table 270 might be associated with different MCSs, and the UE might use the values of such parameters to determine an appropriate MCS. The lookup table 270 might be preconfigured such that the values of a first set 272 of such parameters are correlated with the first MCS 240, the values of a second set 274 of such parameters are correlated with the second MCS 250, and so on up to the values of an nth set 276 of parameters that are correlated with the nth MCS 260. For example, a first range of UE speeds and a first range of SiNR values might be associated with the first MCS 240, a second range of UE speeds and a second range of SiNR values might be associated with the second MCS 250, and so on. When the UE has determined one or more current values of such parameters, the UE might find values in the lookup table 270 that match the measured values, find the MCS correlated with the values of that set of parameters in the lookup table 270, and select that MCS for use in its future transmissions.

The UE might also be aware of which subsets of its available pilots are associated with which MCSs. When the UE has selected an appropriate MCS based on the values in the lookup table 270, the UE might select one of the pilots from the subset associated with that MCS and might transmit that pilot as an indication or a request from the UE to the access point that future transmissions from the UE might need to use that new MCS. The access point might also be aware of which pilots are associated with which MCSs and thus might infer from the received pilot which MCS the UE will use for future transmissions. It may be noted that the MCS of the UE's pilot does not change; it is the MCS of the UE's data transmissions that is modified in the manner described.

Additional concepts related to a lookup table for an MCS that best fits channel conditions might be considered from the access point's perspective and from the UE's perspective. An access point might perform uplink-based measurement and control based on surrounding uplink interference, which might be determined through an exchange of information with neighboring access points; based on uplink signal quality, which might be determined through initial access information or a sounding reference signal; based on the mobility and/or location of the UE; based on a UE categorization, which might be updated periodically; and/or based on a downlink measurement report from the UE, such as a Channel Quality Index (CQI) report. Different CQI values might be mapped to different MCSs in a long-term link adaptation lookup table such as the lookup table 270 in FIG. 2. Such a lookup table might be smaller than a lookup table for short-term link adaptation. In addition, the access point might periodically perform channel adaptation by upgrading or downgrading the UE's MCS, e.g., based on the uplink measurements as explained above. The access point might send to the UE an indication of a configuration or reconfiguration of at least one UE uplink transmission parameter for grant-free uplink transmissions. The at least one UE uplink transmission parameter may include at least one of a transmission resource and a transmission scheme. Then, the access point might signal an adaptation or reconfiguration to a UE by RRC or DCI signaling to a specific UE or by broadcast or multicast signaling to one or more UEs. From the UE's perspective, the UE might receive the indication of a configuration or a reconfiguration of at least one UE uplink transmission parameter for grant-free uplink transmissions from the access point, and upgrade or downgrade its MCS based on the mapping of the MCSs to CQI values. The UE might update the MCS or might request an update of the MCS and receive a reconfiguration from the access point. Then, the UE might send an uplink packet transmission that includes at least one configured or reconfigured transmission parameter, to be received by the access point.

As mentioned above, in addition to the MCS being changed in adaptation to changing channel conditions or other changing parameters, the numerology used by a UE might also be changed in adaptation to changing channel conditions or other changing parameters. That is, if a UE has a pre-assigned numerology option (e.g., subcarrier spacing, cyclic prefix length, and number of symbols per slot), and if the UE's mobility and/or environment conditions change, the current numerology might no longer be appropriate, and the UE might need to change to another numerology option. In an embodiment, there are at least two schemes for such a change. In one scheme, the UE applies the transmission adaptation to the UE's first packet transmission after the need for transmission adaptation is detected. In this case, the UE might select a better numerology option for the grant-free first-packet uplink transmission and use an indication signal (such as a pilot signal, a DMRS, a preamble, or uplink control information) to notify an access point of the change the UE has made to the numerology. In another scheme, the UE uses the current transmission scheme to transmit the grant-free first-packet uplink transmission and includes an indication message for a request of the new numerology option in the packet to receive permission for the adaptation from the access point. In an embodiment, the new numerology might be selected in a manner similar to the manner in which the MCS is selected, as described above.

Adaptation for packet size will now be considered. In the preconfiguration of uplink transmission parameters in a grant-free environment, a fixed size is typically assigned to the data packets to be transmitted by a UE, where the assignment configuration can be done either semi-statically or dynamically, for example, by RRC, broadcast/multicast, or L1 (e.g., DCI) signaling. In some cases, a UE might need to transmit a packet that is larger or smaller than the preconfigured packet size. A fixed packet size greater than the size of the packet to be transmitted might result in wasted resources. A fixed packet size less than the size of the packet to be transmitted might necessitate segmentation of the packet and individual transmissions of each of the separate segments. Transmission adaptation might be employed in such cases such that an MCS is chosen that allows for a packet size that more closely matches the size of the packet to be transmitted. For a given MCS (for example, in a case where the UE's channel is not changing significantly), packet size adaptation might be considered in the use of a larger or smaller resource group than the resource group currently used by the UE.

Figure 3:
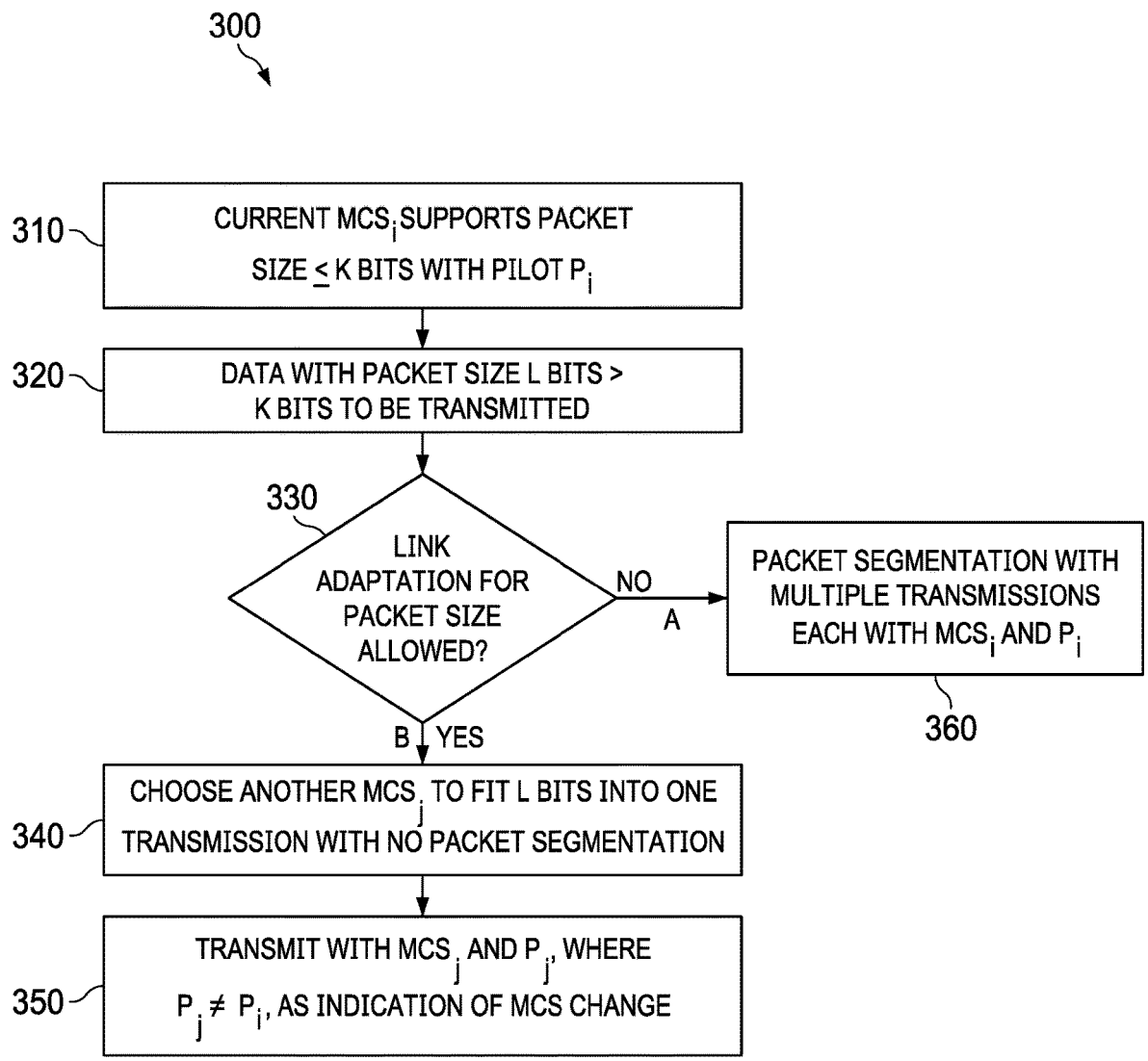
FIG. 3 is a flowchart of an embodiment method for adaptation for packet size.

FIG. 3 is a flowchart of an embodiment method 300 for adaptation for the size of a packet to be transmitted by a UE. At block 310, the UE currently has a preconfigured MCS ($MCS_i$) that supports transmission of packets with a size less than or equal to k bits with a preconfigured pilot ($P_i$). At block 320, the UE might need to transmit data with a packet size of L bits, which is greater than k bits. Some systems might allow link adaptation for packet size and some might not. At block 330, if link adaptation for packet size is allowed (which can be configured either semi-statically or dynamically, for example, by RRC, broadcast/multicast, or L1 (e.g., DCI) signaling), the actions in path B might be taken. That is, at block 340, in the manner described above, the UE might choose a different MCS (MCS) that allows the L bits to be included in a single transmission without packet segmentation. At block 350, the UE might then begin transmitting data with the new $MCS_j$ and, in the manner described above, might also transmit a different pilot (P) as an indication to the access point of the change in the MCS. Alternatively, the UE might begin transmitting data with the new $MCS_j$ but with the same pilot, in which case the access point might blind detect new the $MCS_j$. If, at block 330, link adaptation for packet size is not allowed, the actions in path A might be taken. That is, at block 360, the current $MCS_i$ and $P_i$ might be maintained, and packet segmentation might be performed with multiple transmissions to transmit the segmented packets.

It may be noted that if path B is followed, additional resources might be needed and repetition of transmissions might need to be applied in addition to the change in the MCS. It might also be noted that, even if link adaptation for packet size is allowed at block 330, if path B is not feasible, for example if the packet size is too large, path A might need to be followed.

Adaptation to UE mobility will now be considered. In some cases, a change in the speed of a UE might cause the UE to lose its synchronization with an access point, which might necessitate an adjustment of the uplink synchronization. In scheduling request/uplink scheduling grant systems, when a loss of synchronization occurs, an access point might send a timing adjustment (TA) command to a UE informing the UE how to adjust its timing. In a grant-free environment, however, a TA command might not be used, and it might not be clear how resynchronization is to occur.

Figure 4:
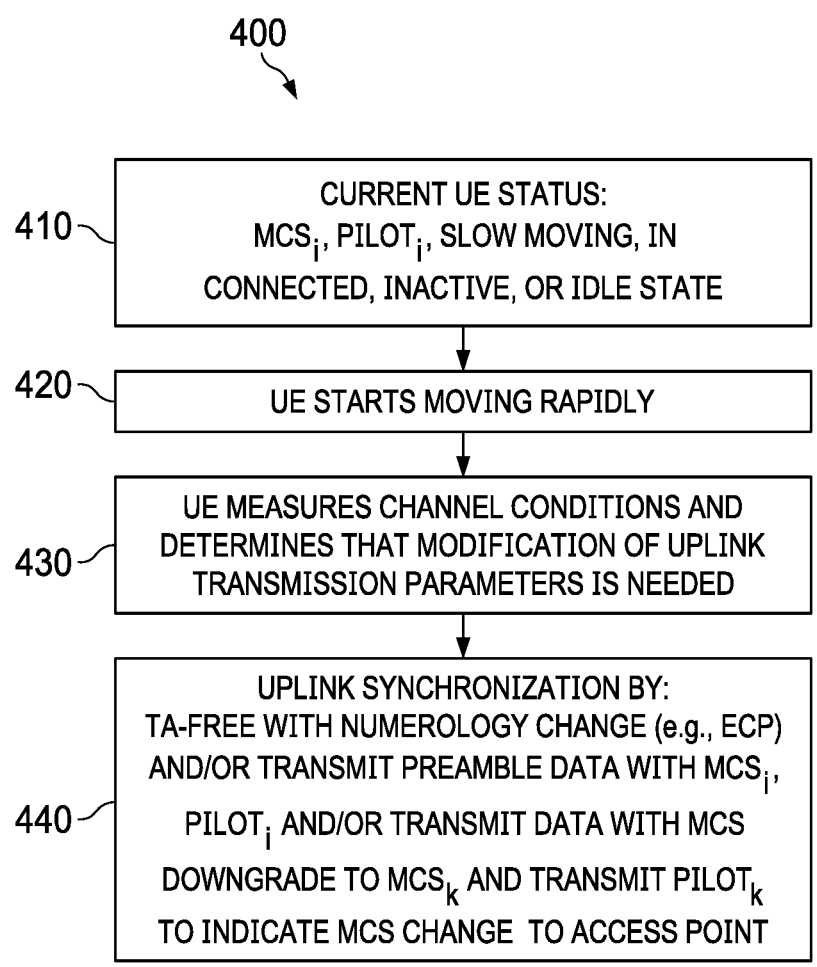
FIG. 4 is a flowchart of an embodiment method for adaptation to mobility.

FIG. 4 is a flowchart of an embodiment method 400 for a UE to adapt to its mobility in a grant-free environment where a TA command is not used. At block 410, the UE currently has a preconfigured MCS ($MCS_i$) and a preconfigured pilot ($pilot_i$), is moving slowly, and is in an RRC connected, inactive, or idle state. At block 420, the UE begins moving rapidly. At block 430, the UE measures its downlink channel conditions and determines that the change in speed has necessitated a modification of its preconfigured uplink transmission parameters. In particular, the UE might have lost its synchronization with the access point due to the change in speed and might need to resynchronize with the access point. At block 440, several options are provided for TA-free uplink synchronization. In one option, the numerology is changed such that the UE uses an extended cyclic prefix (ECP) to maintain the uplink synchronization without any TA signaling from the access point. The UE might send an indication of the numerology change, or the access point might detect the numerology change through blind detection. In another option, the access point sends a traditional preamble to the UE to inform the UE to check the uplink synchronization at the access point. In this option, the preconfigured $MCS_i$ and preconfigured $pilot_i$ might be retained. In another option, the UE might transmit data with the MCS downgraded to $MCS_k$ and transmit a $pilot_k$ to indicate the change of the MCS to the access point. Any of these three options might be used alone or in any combination with one another. The configuration can be done either semi-statically or dynamically, for example, by RRC, broadcast/multicast, or L1 (e.g., DCI) signaling.

As an example, if a UE suddenly moves from a slow moving or static state to a fast moving state, the UE might switch substantially immediately from a normal cyclic prefix to an extended cyclic prefix to keep the uplink synchronized for data transmission. Uplink transmissions from different users might need to be kept synchronized with orthogonal frequency division multiple access (OFDMA) signals, where the synchronization operation means that all uplink user signal arrivals at the access point might need to be kept within a cyclic prefix length, using a reference timing to a cell center user, for example.

Figure 5A:
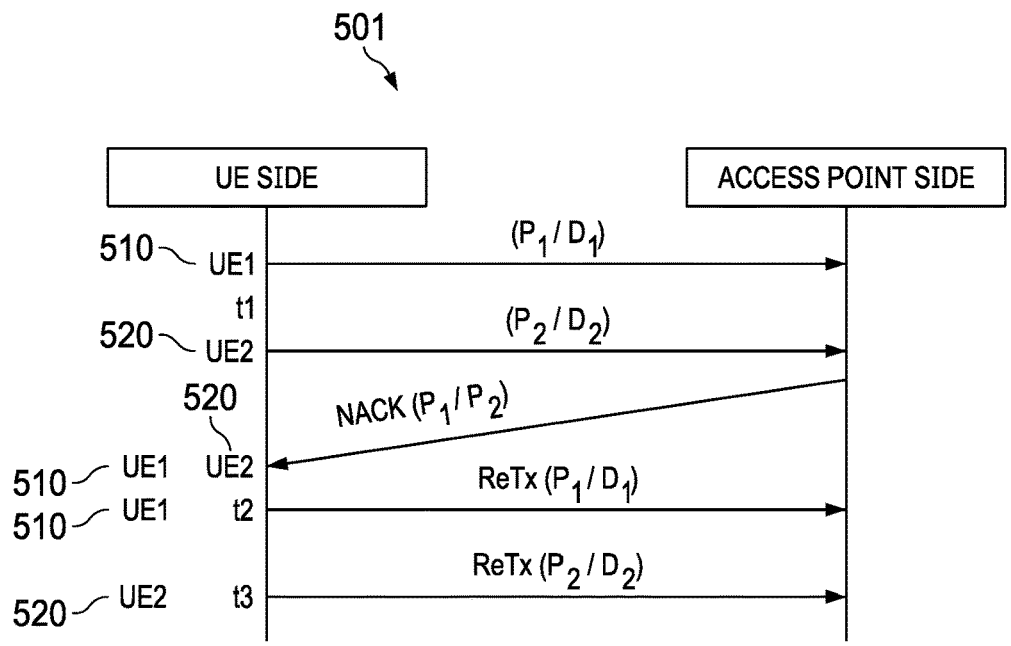
FIGS. 5A and 5B are flowcharts of embodiment methods for managing collisions of data in a grant-free environment.
Figure 5B:
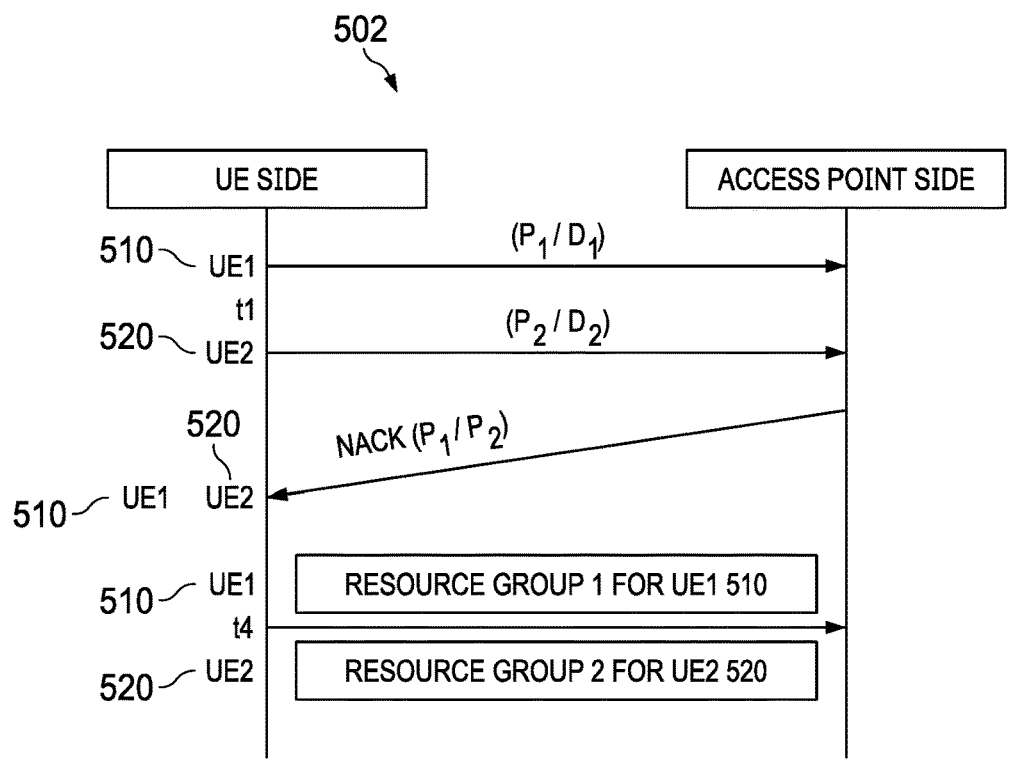

Adaptation to collisions will now be considered. Collisions might occur when two or more UEs attempt to transmit at the same time using the same frequency resources. Collisions might be more likely in a grant-free environment since UEs in a grant-free environment are allowed to transmit at any time rather than being constrained to transmitting according to a coordinated schedule. FIGS. 5A and 5B depict embodiment methods 501 and 502, respectively, for managing data collisions in a grant-free environment.

In FIG. 5A, a first UE 510 and a second UE 520 transmit at the same time, $t_1$, using the same frequency resources. The first UE 510 transmits a first pilot $P_1$ and a first data packet $D_1$, and the second UE 520 transmits a second pilot $P_2$ and a second data packet $D_2$. The pilots might be orthogonal and thus might be separately detectable by an access point. The data packets might not be orthogonal, and thus a collision might occur between the two data sets. The access point might detect the two pilots and thus might know that two sets of data will arrive, but might not properly decode the data because of the collision. In such a case, the access point sends a NACK to the first UE 510 and the second UE 520 indicating that the data was not properly received. Responsive to receiving the NACK, the first UE 510 retransmits the first pilot $P_1$ and the first data packet $D_1$ at a second time, $t_2$, and the second UE 520 retransmits the second pilot $P_2$ and the second data packet $D_2$ at a third time, $t_3$. Times $t_2$ and $t_3$ might be randomly generated by the first UE 510 and the second UE 520, respectively, based on seeds received from the access point in the NACK. Because $t_2$ and $t_3$ are generated from different seeds, it is unlikely that $t_2$ and $t_3$ will be the same, and thus it is unlikely that another collision will occur in the retransmissions.

FIG. 5B depicts a scenario similar to that in FIG. 5A, where a collision occurs because the first UE 510 and the second UE 520 transmit at the same time, $t_1$, using the same frequency resources. In this case, responsive to receiving the NACK, the first UE 510 and the second UE 520 retransmit at the same time, $t_4$, but transmit in a grant-free manner using different resource groups or different hopping resources. Because different frequencies are used for the retransmissions, it is unlikely that another collision will occur in the retransmissions.

Thus, in FIGS. 5A and 5B, a collision occurs in the initial transmissions because the same time and frequency resources are used. A collision is avoided in the retransmissions by separating the retransmissions in the time domain or the frequency domain. Alternatively, a combination of FIGS. 5A and 5B might be implemented, and the retransmissions might be separated in both the time and frequency domains.

Figure 6A:
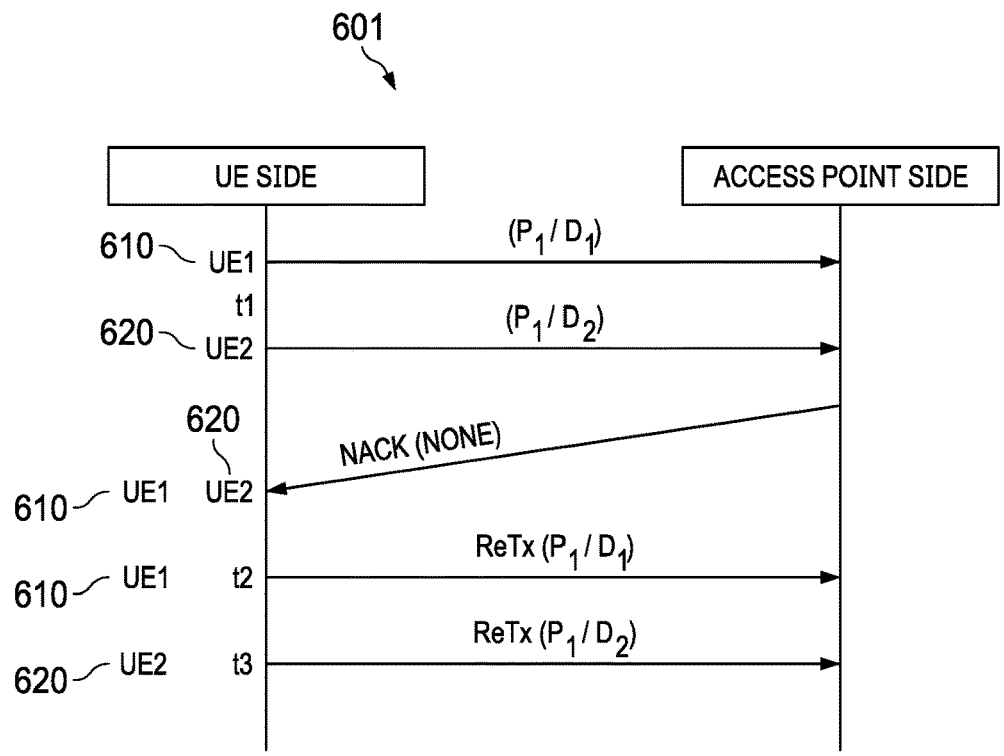
FIGS. 6A and 6B are flowcharts of embodiment methods for managing collisions of pilots in a grant-free environment.
Figure 6B:
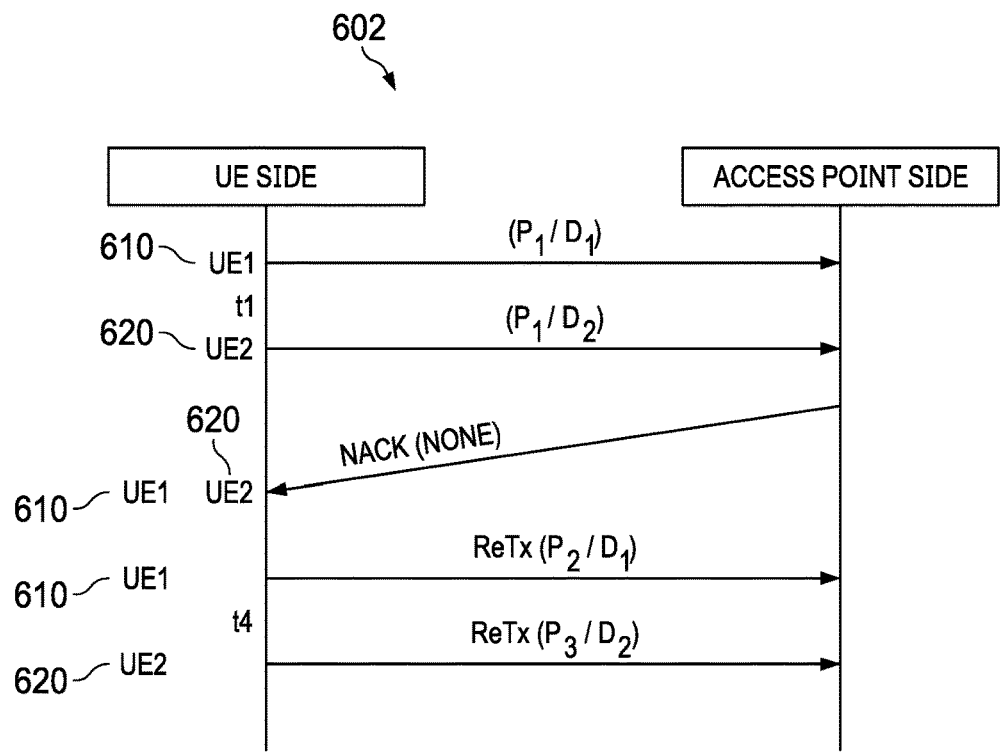

Collisions might also occur between pilots, because the number of transmitting UEs in a given area might be greater than the number of pilots available for use by the UEs. Thus, two or more UEs in a grant-free environment might, by chance, use the same pilot at the same time. When an access point receives simultaneous transmissions from two or more UEs that use the same pilot, the access point might not be able to decode the data because of the collision between the pilots. FIGS. 6A and 6B depict embodiment methods 601 and 602, respectively, for managing collisions of pilots in a grant-free environment.

In FIG. 6A, a first UE 610 and a second UE 620 transmit at the same time, $t_1$, using the same frequency resources. The first UE 610 transmits a first data packet $D_1$, and the second UE 620 transmits a second data packet $D_2$, but the first UE 610 and the second UE 620, by coincidence, use the same pilot $P_1$. A collision occurs between the two pilots, and thus the access point might not properly decode the data. In such a case, the access point sends a NACK to the first UE 610 and the second UE 620 indicating that the transmissions were not properly received. Responsive to receiving the NACK, the first UE 610 retransmits the first data packet $D_1$ at a second time, $t_2$, and the second UE 620 retransmits the second data packet $D_2$ at a third time, $t_3$. In this case, the first UE 610 and the second UE 620 can reuse the same pilot, $P_1$, that was used in the original transmissions, since the retransmissions occur at different times. Times $t_2$ and $t_3$ might be randomly generated based on seeds the first UE 610 and the second UE 620 receive from the access point in the NACK. Because $t_2$ and $t_3$ are generated from different seeds, it is unlikely that $t_2$ and $t_3$ will be the same, and thus it is unlikely that another collision will occur in the retransmissions, even though the retransmissions use the same pilot.

FIG. 6B depicts a scenario similar to that in FIG. 6A, where a collision occurs because the first UE 610 and the second UE 620 transmit at the same time, $t_1$, using the same pilot, $P_1$. In this case, responsive to receiving the NACK, the first UE 610 and the second UE 620 retransmit at the same time, $t_4$, but transmit using pilots selected by each UE. It is likely the UEs will select different pilots, because it is unlikely the UEs will again, by chance, select the same pilot. Because different pilots are used for the retransmissions, it is likely that the access point will be able to decode the data. Thus, another collision might be avoided in the retransmissions even though the retransmissions occur at the same time.

As an alternative to the embodiment depicted in FIG. 6A, rather than the UEs retransmitting at different times, the UEs might retransmit with different frequencies or different hopping resource groups. As another alternative, any combination of the above scenarios might be implemented. That is, the retransmissions might occur with any combination of different times, different frequencies, or different pilots.

Figure 7:
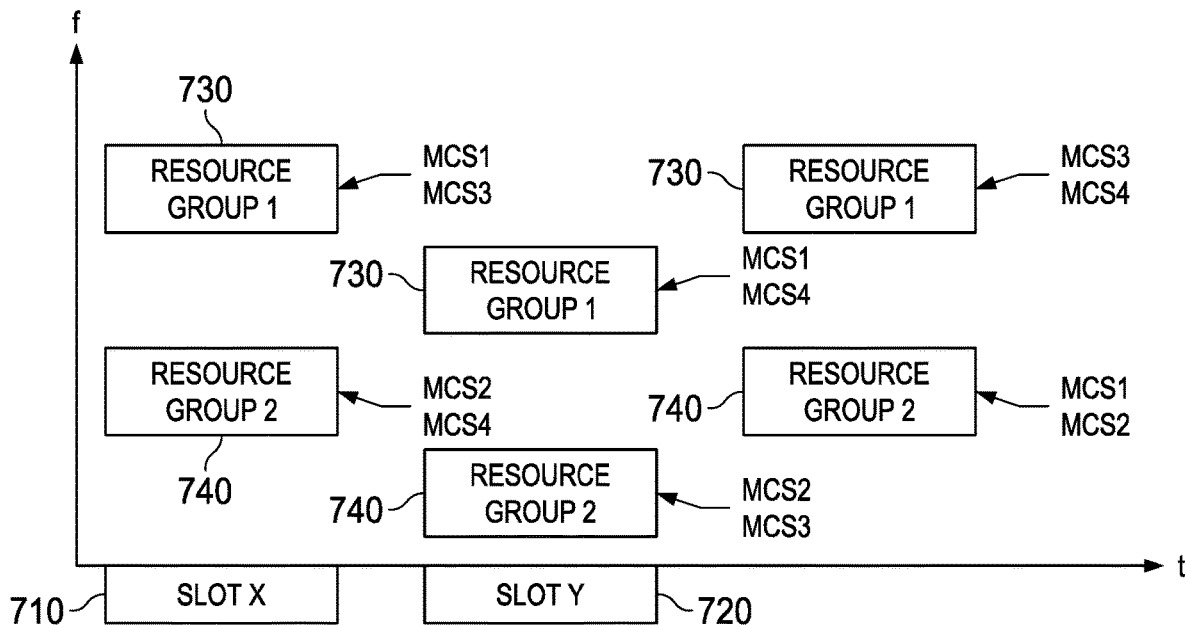
FIG. 7 illustrates an embodiment of transmission adaptation indication by resource group.

In an embodiment, transmission adaptation might be indicated by resource groups, as shown in FIG. 7. An access point might indicate different MCSs and resource hopping locations. Further, the access point might preconfigure different time/frequency resource units or groups with different MCS options. As an example, one resource group in a time slot might have more robust MCSs and the other resource group in that time slot might have more aggressive MCSs that can be used for transmitting larger packet sizes. In an embodiment, UE channel adaptation might be indicated through a UE's use of one of the preconfigured MCS resource groups. The configuration can be done either semi-statically or dynamically, for example, by RRC, broadcast/multicast, or L1 (e.g., DCI) signaling. For example, in a first time slot 710, a first time and frequency resource group 730 and a second time and frequency resource group 740 are available for uplink transmissions. Two different MCSs might be used in each of the resource groups 730 and 740. A UE using one of the resource groups 730 or 740 might use either of the MCSs associated with that resource group 730 or 740. If the UE wishes to use a different MCS than the MCS currently in use, the UE might begin using the other MCS in the resource group 730 or 740 the UE is currently using. The access point might be aware of the resource group 730 or 740 the UE is using and of the MCSs that are associated with the resource groups 730 or 740 and might blind detect which of the two possible MCSs the UE is using. In a second time slot 720, the first resource group 730 and the second resource group 740 are again available, but different MCSs are associated with the resource groups 730 and 740. In other embodiments, other numbers of resource groups and other numbers of MCSs in a resource group might be used. The determination of the number of MCS options in a resource group might involve a trade-off between resource usage and channel adaptation versus blind MCS detection complexity. The number of MCS options in each resource group might be semi-statically adjusted.

As an example, two resource groups might have been assigned in a time slot, but a UE might be currently allocated to use only one resource group that supports packets up to a size of X bytes with a preconfigured MCS. As traffic arrival and packet size might vary, it is possible that a data packet with a size greater than X bytes can arrive. Unless a packet size adaptation scheme is applied, the UE might need to transmit the packet in two time slots with segmentation and delay. One mechanism for handling such a scenario is to predefine one or more special pilots or DMRSs in the resource group the UE is accessing such that one of the special pilots indicates that any data transmission with the pilot will, for example, change the previous resource allocation for the UE by predefinition. Two resource groups might be used to transmit the data packet in this case. The special pilot might be extended longer as needed to cover more frequency resources for data transmission in the time slot. Another mechanism for handling such a scenario is to use an uplink control channel to transmit an indication message to the access point before or at the same time as the first packet data transmission, where the two resource groups are used by one UE to transmit the data packet with the size greater than X bytes without segmentation in the time slot.

Figure 8:
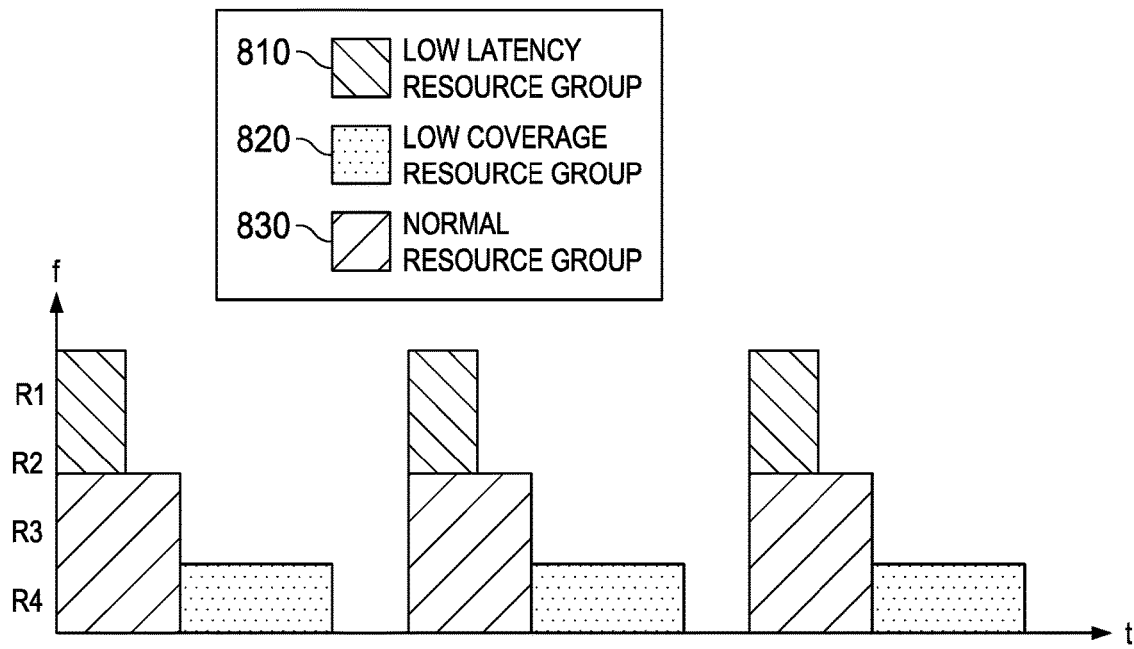
FIG. 8 illustrates an embodiment of selection of a resource group type.

In an embodiment, a UE might use an indicator such as those described above to indicate a desired change to a different type of resource group for use in uplink transmission, as shown in FIG. 8. A plurality of resource groups with different characteristics might be available to the UE, and the UE might select one or more of the resource groups based on the channel conditions and the UE's operational circumstances. A low latency resource group 8100 might have more resources available in the frequency domain than in the time domain. A low coverage resource group 820 might have more resources available in the time domain than in the frequency domain. A normal resource group 830 might have approximately the same resources available in both the time and frequency domains. The normal resource group 830 might be the default resource group. In other embodiments, other types of resource groups might be available. The configuration of these resource groups can be done either semi-statically or dynamically, for example, by RRC, broadcast/multicast, or L1 (e.g., DCI) signaling. When the UE detects that another resource group might be more appropriate for the UE's transmissions than the resource group the UE is currently using, the UE might select an appropriate value for one of the indicators described above to indicate the desired resource group, and the UE might place the indicator in, for example, the initial portion of a data transmission. Responsive to receiving the indicator, the access point might grant the UE resources in the indicated resource group. In other embodiments, the UE might use a separate control channel to transmit the indication message to the access point for the change of resource usage from the currently assigned resource group, for example from the default normal resource group 830 to the low latency resource group 810.

FIG. 9 provides considerations related to power control in grant-free uplink transmissions. The power used for a UE's uplink transmissions is predefined. For example, an open loop and slow loop power control scheme might be employed, wherein the UE transmission power is related to its downlink path loss, which can be measured by, e.g., a downlink pilot or reference signal, in a grant-free environment. In an embodiment, a UE might use an indicator described above to indicate, or a separate reporting message to report, an actual power headroom to the access point for better uplink power control from the access point's perspective.

Figure 10:
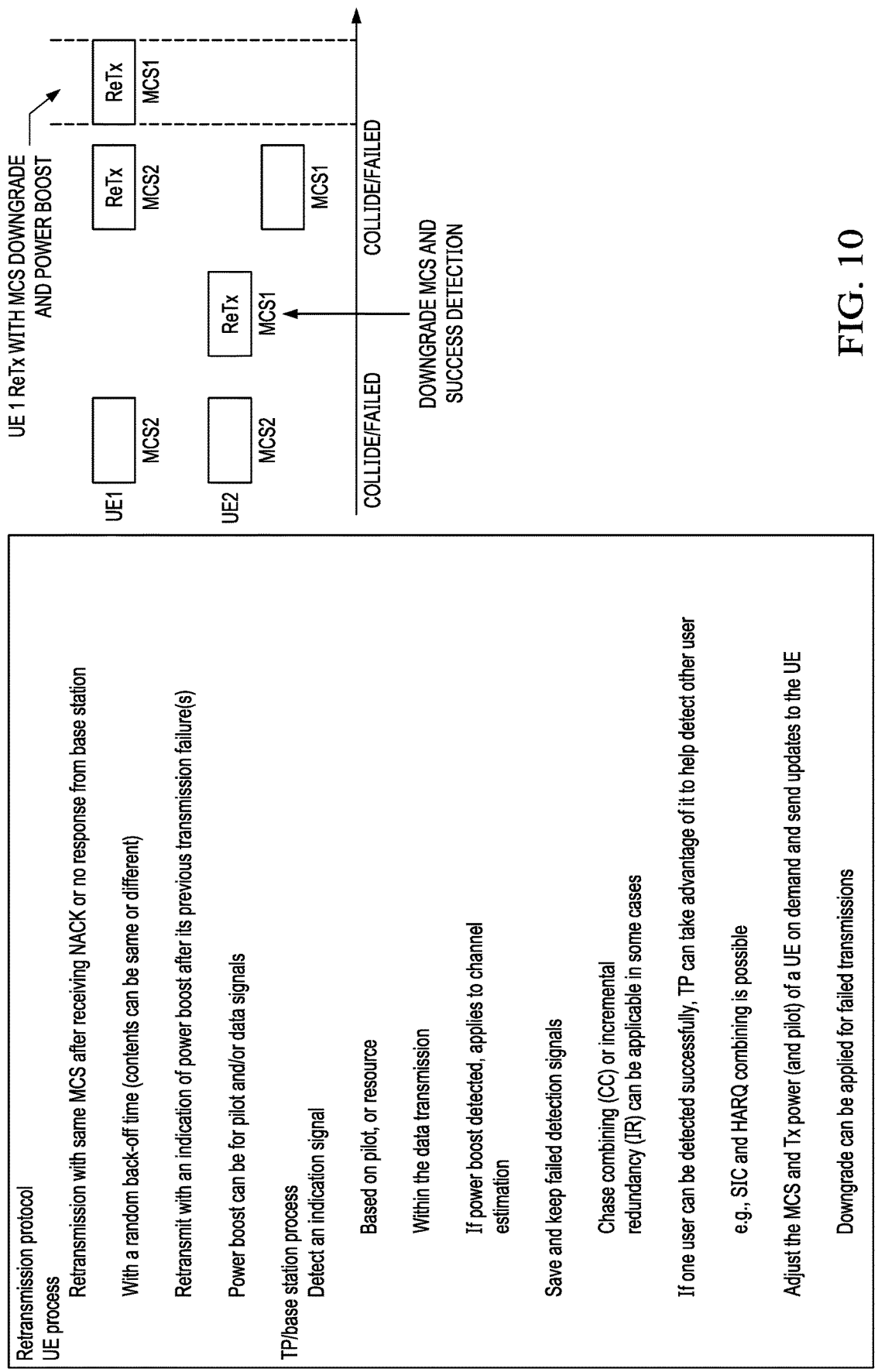
FIG. 10 illustrates an embodiment of power adjustment for grant-free retransmissions.

FIG. 10 provides considerations related to power control in grant-free uplink retransmissions. When a UE retransmits data after a failed initial transmission, the UE might increase the power used for the retransmission of the data. In an embodiment, a UE might use an indicator described above to indicate, or a separate reporting message to report, an actual power headroom to the access point after the power adjustment by the UE with the retransmission such that the access point can have better information on power headroom for better power control from the access point's perspective.

In the above embodiments, transmission adaptation by a UE might be indicated by a pilot transmitted by the UE. That is, each pilot that might be used by a UE might be associated with a particular MCS and possibly other parameters. By transmitting a selected pilot, the UE indicates that the UE has adapted its transmissions and is currently using the MCS and/or other parameters associated with the selected pilot.

Alternatively, a UE might send an access point a request for an adaption of an uplink transmission parameter by placing an indicator in the UE's data transmission. The indicator might occupy a small number of bits in an initial portion of the data transmission and might be encoded such that a particular value of the indicator indicates to the access point the particular transmission adaptation that is requested by the UE.

One transmission adaptation that might be indicated by such a request is the packet size associated with a resource group. A resource group in the time and/or frequency domain might be associated with data packets of a defined but adjustable size. When a UE has data packets to transmit that do not fit in the current packet size of the resource group being used, the UE might segment a packet in an initial transmission into smaller packets and might request that the access point increase the packet size associated with the resource group for future transmissions. To do so, the UE might include in an initial portion of a data transmission an appropriate indicator to indicate that an increase in the resource group's packet size is requested. The indicator might also indicate a request to switch between low latency resources and high latency resources, between low coverage resources and high coverage resources, or between other types of resources.

Another transmission adaptation that might be indicated by such a request is the packet segmentation to be used when a resource group is associated with packets with a fixed size. That is, if the packet size associated with the resource group cannot be adjusted, and if a UE has data packets to transmit that do not fit in the fixed packet size of the resource group being used, the UE might need to segment the oversized packets. The UE might request segmentation information from the access point by including an appropriate indicator in an initial portion of a data transmission.

Yet another transmission adaptation that might be indicated by such a request is the numerology of the UE's transmissions. That is, the UE might request that the cyclic prefix for its transmissions be changed from the normal length to the extended length or vice versa. Additionally or alternatively, the UE might request that the subcarrier spacing used in its transmissions be increased or decreased. To do so, the UE might include in an initial portion of a data transmission an appropriate indicator to indicate the requested change in numerology.

Responsive to receiving a request indicator such as these, the access point might use a control message, such as an update control message, to fulfill or reject the indicated request or to respond to the request in a manner other than the requested manner.

Additionally or alternatively to the indicator indicating a request for a transmission adaptation, the indicator might indicate information associated with the UE. Such information might include UE measurements that indicate channel quality, the speed at which the UE is moving, the UE's location in the cell, the UE's requirements in terms of latency or reliability, and other information.

In an embodiment, a method for transmission adaptation comprises a network predefining pilots and resource blocks (or groups) and mapping the pilots and resource blocks in such a way that any combination of pilots selected from a pool of pilots and one preconfiguration resource block in any time slot is unique. That is, a selection of a plurality of subsets of pilot signals selected from a pool of pilot signals is unique in one resource block. A pool of pilot signals can be reused in different resource blocks as long as the resource blocks for any time slot are different in the frequency domain.

The above embodiment addresses a scenario where the UE adaptation is made by the UE, rather than the UE requesting the adaptation from an access point. The UE might provide a notification of the change by using an indication signal, such as a pilot or a DMRS, with a predefined mapping or rule to the transmission scheme, or by using a separate uplink control signal. The uplink control signal from the access point might be dedicated to a single user or shared among different users. An advantage of this embodiment is that there is no signaling overhead incurred with the adaptation scheme. This embodiment might be applied to any transmission, but in particular might be applied to an initial packet transmission, where the initial packet is the first among a burst of packets upon arrival. Subsequent transmissions or retransmissions might use feedback from an access point generated based on the initial packet transmission and thus might not need a transmission adaptation. For sporadic traffic arrival, an arrival might include only one packet. When an access point becomes aware of the UE adaptation action, the access point might optionally respond with confirmation signaling to the UE, which might include a new preconfiguration or transmission scheme assignment. The above transmission adaptation scheme might be the most efficient for grant-free first-packet uplink transmissions, as there is no additional signaling overhead incurred in the system. As an alternative to a transmission scheme change indication to the access point, a UE might not use any indication to the access point even if the UE changes the current transmission scheme due to the transmission adaptation. In such a case, the access point can perform blind detection, for example, trying different MCS schemes at the receiver end.

Figure 11:
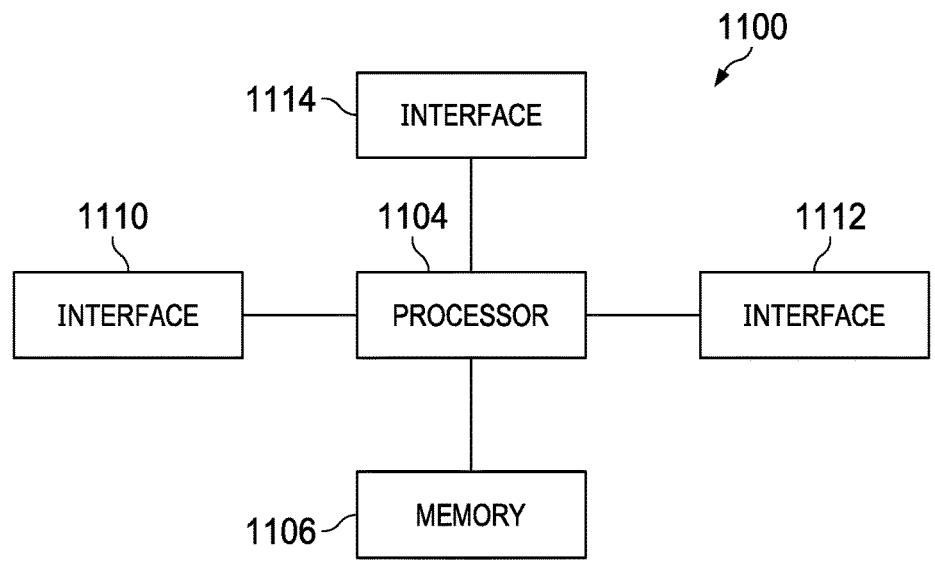
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in the figure. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in the figure, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
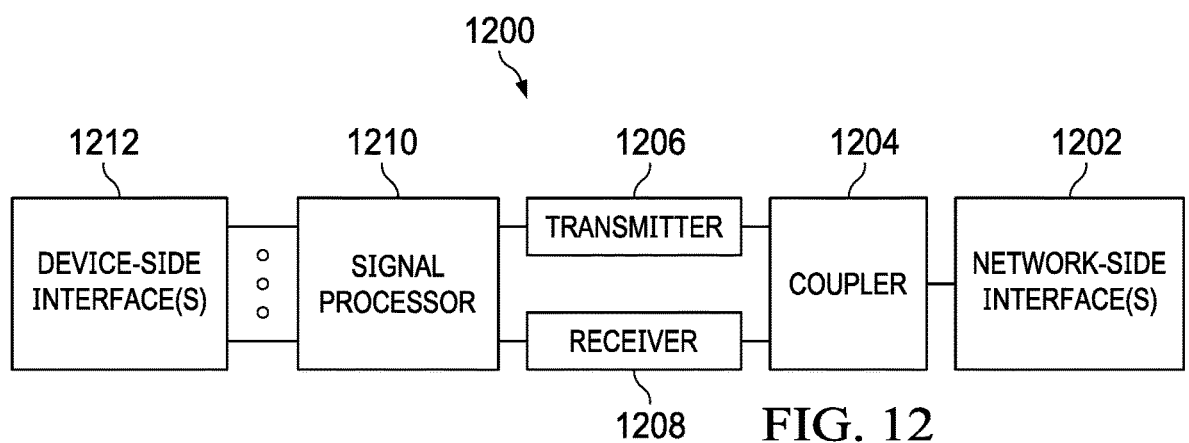
FIG. 12 illustrates a block diagram of a transceiver adapted to transmit and receive signaling over a telecommunications network.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

What is claimed is:

1. A method comprising:
   receiving, by an apparatus from an access point, a second indication signal upon the apparatus transitioning from a Radio Resource Control (RRC) connected state to an RRC inactive state, the second indication signal being different from a previously configured first indication signal and indicating a second transmission scheme selected for the apparatus for grant-free packet uplink transmissions, the second transmission scheme being different from a first transmission scheme currently assigned to the apparatus for the grant-free packet uplink transmissions, wherein the first transmission scheme and the second transmission scheme each includes at least one of:
   a numerology specifying a subcarrier spacing; or
   a resource group for the grant-free packet uplink transmissions.

2. The method of claim 1, wherein the first transmission scheme and the second transmission scheme are semi-statically or dynamically configured or predefined by the access point by RRC signaling, broadcast signaling, or Downlink Control Information (DCI) signaling.

3. The method of claim 2, wherein the first transmission scheme and the second transmission scheme each further includes at least one of:
   a modulation and coding scheme (MCS);
   at least one of a cyclic prefix length or a number of symbols per slot of the numerology;
   a packet size variation with resource block adaptation for data transmission; or
   an actual number of times for repetition of transmission of a transport block (TB) by the apparatus, wherein the actual number of times for the repetition of transmission of the TB in at least one scenario is equal to or larger than a configured, apparatus-specific number of times for repetition of transmission of one TB by the apparatus.

4. The method of claim 3, wherein the resource group is selected responsive to determining that switching to a different resource group enhances resource utilization.

5. The method of claim 3, wherein the MCS is selected based on a lookup table containing a plurality of sets of communication channel parameters, each set of the plurality of sets correlated with a different MCS, and the MCS is correlated with communication channel parameters in the lookup table that match downlink channel conditions measured by the apparatus.

6. The method of claim 3, wherein the MCS is selected to accommodate a data packet size different from a preconfigured data packet size assigned in a preconfiguration of the apparatus.

7. The method of claim 1, wherein the second indication signal comprises at least one of:
   a pilot signal;
   a demodulation reference signal;
   a second pilot signal associated with the resource group;
   a preamble; or
   uplink control information for an adaptation indication.

8. The method of claim 7, wherein the pilot signal is a member of one of a plurality of subsets of a pool of pilot signals, wherein each subset of the subsets is associated with a different MCS, and wherein transmission by the apparatus of one of the pilot signals in a selected subset indicates that an MCS associated with the selected subset is to be used by the apparatus in a subsequent data transmission.

9. The method of claim 1, wherein, when a collision occurs between a first data packet transmitted by the apparatus and a second data packet transmitted by a second apparatus, retransmission of the first data packet and the second data packet occurs by at least one of:
   the apparatus retransmitting the first data packet at a first time and the second apparatus retransmitting the second data packet at a second time, wherein the first time and the second time are different; or
   the apparatus retransmitting the first data packet at a first frequency resource and the second apparatus retransmitting the second data packet at a second frequency resource, wherein the first frequency resource and the second frequency resource are different.

10. The method of claim 1, wherein, when a collision occurs between a first data packet transmitted by the apparatus and a second data packet transmitted by a second apparatus because a same pilot signal is associated with both the first data packet and the second data packet, retransmission of the first data packet and the second data packet occurs by at least one of:
    the apparatus retransmitting the first data packet at a first time and the second apparatus retransmitting the second data packet at a second time, wherein the first time and the second time are different, and wherein the apparatus and the second apparatus use the same pilot signal;
    the apparatus retransmitting the first data packet at a first frequency resource and the second apparatus retransmitting the second data packet at a second frequency resource, wherein the first frequency resource and the second frequency resource are different, and wherein the apparatus and the second apparatus use the same pilot signal; or
    the apparatus and the second apparatus retransmitting the first data packet and the second data packet with different pilot signals.

11. The method of claim 1, wherein the second indication signal includes an indicator indicating at least one of:
    a transmission adaptation made by the apparatus;
    a transmission adaptation requested by the apparatus;
    information about transmission characteristics related to the apparatus; or
    a response to a request by the apparatus to use one of a plurality of resource group types, wherein the resource group types include at least a normal type with approximately equal amounts of resources allocated in a time domain and a frequency domain, a low latency type with more resources allocated in the frequency domain than in the time domain, and a low coverage type with more resources allocated in the time domain than in the frequency domain.

12. The method of claim 1, further comprising:
receiving, by the apparatus from the access point, a third indication signal upon at least one of:
the apparatus transitioning from the RRC inactive state to the RRC connected state,
downlink pilot measurements,
environment changes including the apparatus moving to a different network area or moving from a slow moving state to a fast moving state,
arrival packet size variations, or
traffic loading and contention changes,
wherein the third indication signal is different from the second indication signal and indicates a third transmission scheme selected for the apparatus for the grant-free packet uplink transmissions, and wherein the third transmission scheme is different from the second transmission scheme.

13. A method comprising:
sending, by an access point to a user equipment (UE), a second indication signal upon the UE transitioning from a Radio Resource Control (RRC) connected state to an RRC inactive state, the second indication signal being different from a previously configured first indication signal and indicating a second transmission scheme selected for the UE for grant-free packet uplink transmissions, the second transmission scheme being different from a first transmission scheme currently assigned to the UE for the grant free packet uplink transmissions, wherein the first transmission scheme and the second transmission scheme each includes at least one of:
a numerology specifying a subcarrier spacing; or
a resource group for the grant-free packet uplink transmissions.

14. The method of claim 13, wherein the access point semi-statically or dynamically configures or predefines the first transmission scheme and the second transmission scheme by RRC signaling, broadcast signaling, or Downlink Control Information (DCI) signaling.

15. The method of claim 13, wherein the first transmission scheme and the second transmission scheme each further includes at least one of:
a modulation and coding scheme (MCS);
at least one of a cyclic prefix length or a number of symbols per slot of the numerology;
a packet size variation with resource block adaptation for data transmission; or
an actual number of times for repetition of transmission of a transport block (TB) by the UE, wherein the actual number of times for the repetition of transmission of the TB in at least one scenario is equal to or larger than a configured, UE-specific number of times for repetition of transmission of one TB by the UE.

16. The method of claim 13, wherein the second indication signal comprises at least one of:
a pilot signal;
a demodulation reference signal;
a second pilot signal associated with the resource group;
a preamble; or
uplink control information for an adaptation indication.

17. The method of claim 13, wherein the second indication signal includes an indicator indicating at least one of:
a transmission adaptation made by the UE;
a transmission adaptation requested by the UE;
information about transmission characteristics related to the UE; or
a response to a request by the UE to use one of a plurality of resource group types, wherein the resource group types include at least a normal type with approximately equal amounts of resources allocated in a time domain and a frequency domain, a low latency type with more resources allocated in the frequency domain than in the time domain, and a low coverage type with more resources allocated in the time domain than in the frequency domain.

18. An apparatus comprising:
a non-transitory memory storage comprising instructions; and
one or more processors in communication with the non-transitory memory storage, wherein the one or more processors execute the instructions to:
receive, from an access point, a second indication signal upon the apparatus transitioning from a Radio Resource Control (RRC) connected state to an RRC inactive state, the second indication signal being different from a previously configured first indication signal and indicating a second transmission scheme selected for the apparatus for grant-free packet uplink transmissions, the second transmission scheme being different from a first transmission scheme currently assigned to the apparatus for the grant-free packet uplink transmissions, wherein the first transmission scheme and the second transmission scheme each includes at least one of:
a numerology specifying a subcarrier spacing; or
a resource group for the grant-free packet uplink transmissions.

19. The apparatus of claim 18, wherein the first transmission scheme and the second transmission scheme are semi-statically or dynamically configured or predefined by the access point by RRC signaling, broadcast signaling, or Downlink Control Information (DCI) signaling.

20. The apparatus of claim 19, wherein the first transmission scheme and the second transmission scheme each further includes at least one of:
a modulation and coding scheme (MCS);
at least one of a cyclic prefix length or a number of symbols per slot of the numerology;
a packet size variation with resource block adaptation for data transmission; or
an actual number of times for repetition of transmission of a transport block (TB) by the apparatus, wherein the actual number of times for the repetition of transmission of the TB in at least one scenario is equal to or larger than a configured, apparatus-specific number of times for repetition of transmission of one TB by the apparatus.

21. The apparatus of claim 20, wherein the resource group is selected responsive to determining that switching to a different resource group enhances resource utilization.

22. The apparatus of claim 18, wherein the second indication signal comprises at least one of:
a pilot signal;
a demodulation reference signal;
a second pilot signal associated with the resource group;
a preamble; or
uplink control information for an adaptation indication.

23. The apparatus of claim 22, wherein the pilot signal is a member of one of a plurality of subsets of a pool of pilot signals, wherein each subset of the subsets is associated with a different MCS, and wherein transmission by the apparatus of one of the pilot signals in a selected subset indicates that an MCS associated with the selected subset is to be used by the apparatus in a subsequent data transmission.

24. The apparatus of claim 18, wherein the second indication signal includes an indicator indicating at least one of:
 a transmission adaptation made by the apparatus;
 a transmission adaptation requested by the apparatus;
 information about transmission characteristics related to the apparatus; or
 a response to a request by the apparatus to use one of a plurality of resource group types, wherein the resource group types include at least a normal type with approximately equal amounts of resources allocated in a time domain and a frequency domain, a low latency type with more resources allocated in the frequency domain than in the time domain, and a low coverage type with more resources allocated in the time domain than in the frequency domain.

25. The apparatus of claim 18, wherein the one or more processors further execute the instructions to:
 receive, from the access point, a third indication signal upon at least one of:
  the apparatus transitioning from the RRC inactive state to the RRC connected state,
  downlink pilot measurements,
  environment changes including the apparatus moving to a different network area or moving from a slow moving state to a fast moving state,
  arrival packet size variations, or
  traffic loading and contention changes,
 wherein the third indication signal is different from the second indication signal and indicates a third transmission scheme selected for the apparatus for the grant-free packet uplink transmissions, and wherein the third transmission scheme is different from the second transmission scheme.

26. An access point comprising:
 a non-transitory memory storage comprising instructions; and
 one or more processors in communication with the non-transitory memory storage, wherein the one or more processors execute the instructions to:
  send, to a user equipment (UE), a second indication signal upon the UE transitioning from a Radio Resource Control (RRC) connected state to an RRC inactive state, the second indication signal being different from a previously configured first indication signal and indicating a second transmission scheme selected for the UE for grant-free packet uplink transmissions, the second transmission scheme being different from a first transmission scheme currently assigned to the UE for the grant-free packet uplink transmissions, wherein the first transmission scheme and the second transmission scheme each includes at least one of:
   a numerology specifying a subcarrier spacing; or
   a resource group for the grant-free packet uplink transmissions.

27. The access point of claim 26, wherein the access point semi-statically or dynamically configures or predefines the first transmission scheme and the second transmission scheme by RRC signaling, broadcast signaling, or Downlink Control Information (DCI) signaling.

28. The access point of claim 26, wherein the first transmission scheme and the second transmission scheme each further includes at least one of:
 a modulation and coding scheme (MCS);
 at least one of a cyclic prefix length or a number of symbols per slot of the numerology;
 a packet size variation with resource block adaptation for data transmission; or
 an actual number of times for repetition of transmission of a transport block (TB) by the UE, wherein the actual number of times for the repetition of transmission of the TB in at least one scenario is equal to or larger than a configured, UE-specific number of times for repetition of transmission of one TB by the UE.

29. The access point of claim 26, wherein the second indication signal comprises at least one of:
 a pilot signal;
 a demodulation reference signal;
 a second pilot signal associated with the resource group;
 a preamble; or
 uplink control information for an adaptation indication.

30. The access point of claim 26, wherein the second indication signal includes an indicator indicating at least one of:
 a transmission adaptation made by the UE;
 a transmission adaptation requested by the UE;
 information about transmission characteristics related to the UE; or
 a response to a request by the UE to use one of a plurality of resource group types, wherein the resource group types include at least a normal type with approximately equal amounts of resources allocated in a time domain and a frequency domain, a low latency type with more resources allocated in the frequency domain than in the time domain, and a low coverage type with more resources allocated in the time domain than in the frequency domain.

* * * * *